(12) United States Patent
Sandou

(10) Patent No.: US 9,810,133 B2
(45) Date of Patent: Nov. 7, 2017

(54) ENGINE DEVICE FOR WORK VEHICLE

(71) Applicant: YANMAR CO., LTD., Osaka (JP)

(72) Inventor: Yoshiyuki Sandou, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 15/030,680

(22) PCT Filed: Oct. 22, 2014

(86) PCT No.: PCT/JP2014/078126
§ 371 (c)(1),
(2) Date: Apr. 20, 2016

(87) PCT Pub. No.: WO2015/060355
PCT Pub. Date: Apr. 30, 2015

(65) Prior Publication Data
US 2016/0258337 A1 Sep. 8, 2016

(30) Foreign Application Priority Data

Oct. 25, 2013 (JP) .................. 2013-222366
Oct. 25, 2013 (JP) .................. 2013-222367

(51) Int. Cl.
*F01N 3/00* (2006.01)
*F01N 13/18* (2010.01)
(Continued)

(52) U.S. Cl.
CPC ......... *F01N 13/1805* (2013.01); *F01N 3/021* (2013.01); *F01N 3/2066* (2013.01);
(Continued)

(58) Field of Classification Search
USPC .......... 60/272, 282, 286, 295, 297, 301, 303
See application file for complete search history.

(56) References Cited

U.S. PATENT DOCUMENTS 8,191,668 B2 *  6/2012  Keane .................... B60K 13/04
                                                  180/296
8,973,353 B2 *  3/2015  Sawada .................... F01N 3/10
                                                  60/286

(Continued)

FOREIGN PATENT DOCUMENTS

JP    2006-144738    6/2006
JP    2009-074420    4/2009
(Continued)

*Primary Examiner* — Binh Q Tran
(74) *Attorney, Agent, or Firm* — Norris McLaughlin & Marcus, P.A.

(57) ABSTRACT

A engine device for a work vehicle, in which an engine, a first case, and a second case can be constituted in the same vibration structure, and exhaust gas path structure between the engine and the second case can be constituted in such a manner as to reduce costs. The engine device for a work vehicle according to the present invention of the instant application includes the first case for removing particulate matter in exhaust gas of the engine and the second case for removing nitrogen oxides in the exhaust gas of the engine, and configured to connect the first case to the second case via a urea mixing pipe. The engine, the first case, and the second case are integrally adhered, and the engine, the first case, and the second case are configured to be integrally vibrated in a swingable manner.

10 Claims, 21 Drawing Sheets

(51) Int. Cl.
    *F01N 3/20*        (2006.01)
    *F01N 3/021*      (2006.01)
    *F01N 3/10*        (2006.01)
    *F01N 3/035*      (2006.01)

(52) U.S. Cl.
    CPC .............. *F01N 3/035* (2013.01); *F01N 3/106* (2013.01); *F01N 2240/20* (2013.01); *F01N 2450/30* (2013.01); *F01N 2470/18* (2013.01); *F01N 2590/08* (2013.01); *F01N 2610/02* (2013.01); *F01N 2610/1406* (2013.01); *F01N 2610/1453* (2013.01); *Y02T 10/24* (2013.01)

(56) References Cited

U.S. PATENT DOCUMENTS

| | | | | |
|---|---|---|---|---|
| 8,973,692 | B1 * | 3/2015 | Okuda | B60L 11/1877 |
| | | | | 180/68.5 |
| 8,979,125 | B2 * | 3/2015 | Sato | E02F 9/0866 |
| | | | | 180/196 |
| 9,010,095 | B2 * | 4/2015 | Himoto | E02F 9/0833 |
| | | | | 180/296 |
| 2010/0186394 | A1 | 7/2010 | Harrison et al. | |
| 2011/0079003 | A1 * | 4/2011 | Sun | F01N 3/2066 |
| | | | | 60/310 |
| 2011/0154809 | A1 | 6/2011 | Mitsuda et al. | |
| 2012/0017574 | A1 | 1/2012 | Hasan et al. | |
| 2012/0273648 | A1 | 11/2012 | Maske et al. | |
| 2015/0240447 | A1 * | 8/2015 | Homma | E02F 9/0833 |
| | | | | 180/309 |

FOREIGN PATENT DOCUMENTS

| | | |
|---|---|---|
| JP | 2011-226298 | 11/2011 |
| JP | 2012-021505 | 2/2012 |
| JP | 2012-177233 | 9/2012 |
| JP | 2012-215022 | 11/2012 |
| JP | 2013-104394 | 5/2013 |
| JP | 2013-151185 | 8/2013 |
| JP | 2013-155706 | 8/2013 |

* cited by examiner

ENGINE DEVICE FOR WORK VEHICLE

TECHNICAL FIELD

The present invention of the instant application relates to an engine device such as a diesel engine mounted on an agricultural machine (a tractor and a combine harvester) or a construction machine (a bulldozer, a hydraulic excavator, and a loader), and more specifically relates to an engine device for work vehicles, in which an exhaust gas purification device is mounted that removes particulate matter (soot and particulates) included in exhaust gas or nitrogen oxides (NOx) included in the exhaust gas, and the like.

BACKGROUND OF THE INVENTION

Regarding work vehicles such as a tractor and a wheel loader, an opening/closing fulcrum shaft is arranged in the rear portion of a hood for covering an engine, and the hood is rotated about the opening/closing fulcrum shaft, for the purpose of improving the efficiency of maintenance work for the engine arranged in the front of a travelling vehicle body. Also, a technology of purification treatment has been known theretofore, wherein a case (hereinafter referred to as "DPF case") in which a diesel particulate filter is internally provided, and a case (hereinafter referred to as "SCR case") in which a urea selective reduction catalyst is internally provided are provided in the exhaust path of a diesel engine as an exhaust gas purification device (exhaust gas after-treatment device), and the exhaust gas is introduced into the DPF case and the SCR case, thereby purifying the exhaust gas discharged from the diesel engine (for example, see Patent Literatures 1 to 4).

PATENT LITERATURE

PTL 1: Japanese Unexamined Patent Application Publication No. 2009-74420
PTL 2: Japanese Unexamined Patent Application Publication No. 2012-21505
PTL 3: Japanese Unexamined Patent Application Publication No. 2013-104394
PTL 4: Japanese Unexamined Patent Application Publication No. 2012-177233

SUMMARY OF INVENTION

As Patent Literatures 1 to 3, when the DPF case and the SCR case are assembled while being separated from the engine, the temperature of the exhaust gas supplied from the engine to the DPF case or the SCR case is reduced, which leads to incompletion of regeneration of a diesel particulate filter or incompletion of chemical reaction such as selective catalyst reduction action. Accordingly, there is a problem in that a specific device for maintaining the temperature of the exhaust gas in the SCR case at a high degree is required. Also, as Patent Literature 3, a technology has been disclosed that the DPF case and the SCR case are mounted on two parallel base frames, and the two base frames are coupled with an object to be installed, thereby mounting the DPF case and the SCR case. However, a mounting surface of the object to be installed needs to be formed horizontally (flat), and therefore there is a problem in that it is difficult to support the supporting posture of the DPF case and the SCR case at a predetermined posture due to machining errors of mounting components such as the base frame. Furthermore, when the diesel particulate filter (soot filter) in the DPF case is cleaned or replaced, it is necessary to detach the whole of the DPF case, disassemble the DPF case, and then detach the diesel particulate filter. Accordingly, there is a problem in that cleaning man-hour for the diesel particulate filter cannot be easily reduced.

On the other hand, as Patent Literature 4, when the DPF case and the SCR case are assembled in the proximity of the engine, reduction in temperature of the exhaust gas supplied from the engine to the SCR case is alleviated, and the temperature of the exhaust gas in the SCR case is easily maintained at a high degree, but it is necessary to secure installation space for the SCR case on the lateral side of the engine, which causes a problem in that it is difficult to make an engine room compact, and the DPF case or the SCR case cannot be supported in a compact way. Also, in a narrow, small engine room, there is a problem in that assembly workability or maintenance workability of the DPF case, the SCR case, or the like cannot be improved.

Accordingly, it is an object of the present invention of the instant application to provide an engine device for a work vehicle, in which improvements are provided in the light of the current circumstances.

In order to achieve the object, an engine device for a work vehicle of the present invention is such that the engine device may include a first case for removing particulate matter in exhaust gas of an engine and a second case for removing nitrogen oxides in the exhaust gas of the engine, and configured to connect the first case to the second case via a urea mixing pipe, and wherein the engine, the first case, and the second case are integrally adhered, and the engine, the first case, and the second case are configured to be integrally vibrated in a swingable manner.

Regarding the engine device for the work vehicle described in the claim 1, the present invention is such that a plurality of supporting leg bodies are vertically installed in a cylinder head of the engine, and a supporting stand is coupled on an upper end side of the plurality of supporting leg bodies, and the first case and the second case are adhered on an upper surface side of the engine via the approximately horizontal supporting stand.

Regarding the engine device for the work vehicle the present invention is such that an inlet pipe of the first case is arranged on a side where an exhaust manifold of the engine is installed, and the first case is mounted in such a manner that the exhaust gas in the first case can transfer in a direction intersecting with a core line of an output shaft of the engine, and the second case is juxtaposed on a lateral part on an installation side of the cooling fan of the engine, on a lateral part of the first case.

Regarding the engine device for the work vehicle, the present invention is such that the work vehicle is such that an operating cabin is arranged in rear of a hood in which the engine is internally installed, and a urea water tank for exhaust gas purification is installed between a front portion of the operating cabin and a rear portion of the engine.

Regarding the engine device for the work vehicle, the present invention is such that the first case is formed in such a manner as to be divided into an exhaust intake side case and an exhaust discharge side case, and the exhaust discharge side case is configured to be separable in a state where the exhaust intake side case is supported on the side of the engine.

Regarding the engine device for the work vehicle, the present invention is such that the engine device further includes an exhaust outlet pipe configured to couple the first case with the urea mixing pipe, and the exhaust outlet pipe is extended on an outer side in a direction intersecting with a transfer direction of the exhaust gas, on an outer side of the exhaust discharge side case, and a coupling portion between the urea mixing pipe and the exhaust outlet pipe is disposed at a position at a position deviated from separation locus of the exhaust discharge side case separated in the transfer direction of the exhaust gas.

Regarding the engine device for the work vehicle, the present invention is such that the engine device further includes a clamping body for adhering the exhaust intake side case and the second case; and a clamping body for adhering the exhaust discharge side case and the second case, and it is configured that the first case and the second case are integrally adhered with each clamping body, thereby forming an exhaust purification unit.

Regarding the engine device for the work vehicle the present invention is such that the engine device further includes a clamping body for integrally adhering the first case and the second case; and a supporting stand for mounting the clamping body, and it is configured that a plurality of supporting leg bodies are vertically installed on an upper surface side of the engine, and the supporting stand is coupled with an exhaust manifold of the engine and the plurality of supporting leg bodies.

According to the present invention, the engine device for the work vehicle includes the first case for removing particulate matter in the exhaust gas of the engine and the second case for removing nitrogen oxides in the exhaust gas of the engine, and configured to connect the first case to the second case via the urea mixing pipe, and the engine, the first case, and the second case are integrally adhered, and the engine, the first case, and the second case are configured to be integrally vibrated in a swingable manner, so that the engine, the first case, and the second case can be constituted in the same vibration structure, and it is not necessary to apply the vibration-proof coupling to the exhaust path between the engine and the first case and the exhaust path between the first case and the second case, and the exhaust gas path structure between the engine and the second case can be constituted in such a manner as to reduce costs. That is, it is not necessary to connect the vibration-proof members, for example, such as the corrugated flexible pipe or a heat-resistant rubber hose in the exhaust gas path between the first case and the second case, so that the exhaust gas path structure between the engine and the second case can be constituted in such a manner as to reduce costs.

According to the present invention, the plurality of supporting leg bodies are vertically installed in the cylinder head of the engine, and the supporting stand is coupled on the upper end side of the plurality of supporting leg bodies, and the first case and the second case are adhered on the upper surface side of the engine via the approximately horizontal supporting stand, so that the supporting stand can be easily separated from the accessory components of the engine. Also, the first case and the second case are integrally mounted with respect to the engine, thereby simplifying the exhaust gas pipes of each case, and the first case and the second case can be adhered with high rigidity to the cylinder head.In addition, the machining errors of the mounting components such as the supporting stand can be alleviated by adjusting the coupling portions between the plurality of supporting leg bodies and the supporting stand, and an inclination angle in mounting the supporting stand can be easily corrected, and the first case and the second case can be supported in a predetermined posture. The assembly workability, in which the first case and the second case are assembled into the engine, can be easily improved.

According to the present invention, the inlet pipe of the first case is arranged on the side where the exhaust manifold of the engine is installed, and the first case is mounted in such a manner that the exhaust gas in the first case can transfer in the direction intersecting with the core line of the output shaft of the engine, and the second case is juxtaposed on. the lateral part on the installation side of the cooling fan of the engine, on the lateral part of the first case, so that the first case and the second case are in close vicinity to each other on the upper surface side of the engine and can be arranged in a compact way, whereas the second case is interposed between the cooling fan and the first case, thereby suppressing the reduction in temperature of the first case due to the wind from the cooling fan. Also, the urea mixing pipe that supplies the exhaust gas from the first case to the second case is supported between the first case and the second case, so that the second case is interposed between the cooling fan and the urea mixing pipe, and the reduction in temperature of the urea mixing pipe due to the wind from the cooling fan can be suppressed.

According to the present invention, the work vehicle is such that the operating cabin is arranged in rear of the hood in which the engine is internally installed, and the urea water tank for exhaust gas purification is installed between the front portion of the operating cabin and the rear portion of the engine, so that the, urea water tank can be heated with the waste heat of the engine and the like, and the urea aqueous solution having a predetermined temperature or higher can be maintained in the urea water tank, and the reduction in the capacity of the exhaust gas purification of the second case can be prevented in cold districts and the like. The water-feeding port of the urea water tank can be adjacently arranged on the operator's boarding and alighting portion of the operating cabin, and water-feeding work of the urea aqueous solution into the urea water tank can he easily executed at the operator's boarding and alighting sites, and the workability of replenishing the urea aqueous solution for the exhaust gas purification can be improved.

According to the present invention, the first case is formed in such a manner as to be divided into the exhaust intake side case and the exhaust discharge side case, and the exhaust discharge side case is configured to be separable in a state where the exhaust intake side case is supported on the side of the engine, so that, during the maintenance work in the interior of the first case, it is not required to remove the whole of the first case, and the number of detachable components that necessitate the maintenance work in the interior of the exhaust discharge side case (the first case) can be easily reduced, and the soot filter internally installed in the exhaust discharge side case and the like can be easily detached, and the cleaning man-hour of the interior of the exhaust discharge side case or the soot filter, or the like can be reduced.

According to the present invention, the engine device further includes the exhaust outlet pipe configured to couple the first case with the urea mixing pipe, and the exhaust outlet pipe is extended on the outer side in the direction intersecting with the transfer direction of the exhaust gas, on the outer side of the exhaust discharge side case, and the coupling portion between the urea mixing pipe and the exhaust outlet pipe is disposed at a position deviated from the separation locus of the exhaust discharge side case separated in the transfer direction of the exhaust gas, so that the fastening bolts of the coupling portion of the urea mixing pipe and the exhaust outlet pipe, or the like are detached, and the coupling of the exhaust intake side case and the exhaust discharge side case is released, so that the exhaust discharge side case is slid in the transfer direction of the exhaust gas in the first case, thereby easily separating the exhaust discharge side case from the exhaust intake side case.

According to the present invention, the engine device further includes a clamping body for adhering the exhaust intake side case and the second case; and a clamping body for adhering the exhaust discharge side case and the second case, and it is configured that the first case and the second case are integrally adhered with each clamping body, thereby forming an exhaust purification unit, so that the exhaust discharge side case can be easily detached by removing the clamping bodies for adhering to the exhaust discharge side case and the second case During the maintenance of the interior of the exhaust discharge side case, the attachment or detachment work of the clamping bodies for adhering to the exhaust intake side case and the second case is eliminated, so that maintenance (the cleaning of the soot filter) workability in the interior of the exhaust discharge side case can be improved.

According to the present invention, the engine device further includes a clamping body for integrally adhering the first case and the second case; and a supporting stand for mounting the clamping body, and it is configured that a plurality of supporting leg bodies are vertically installed on an upper surface side of the engine, and the supporting stand is coupled with an exhaust manifold of the engine and the plurality of supporting leg bodies, so that the machining errors of the mounting components such as the supporting stand can be alleviated by adjusting the coupling portions between the supporting leg bodies and the supporting stand, and an inclination angle in mounting the supporting stand can be easily corrected, and the first case and the second case can be easily supported in a predetermined posture, and the supporting stand is separated away from the accessory components of the engine, thereby supporting the first case and the second case in such a manner as to eliminate mutual interference. The assembly workability, in which the first case and the second case are assembled into the engine, can be easily improved.

DESCRIPTION OF THE PREFERRED EMBODIMENTS

Figure 1:
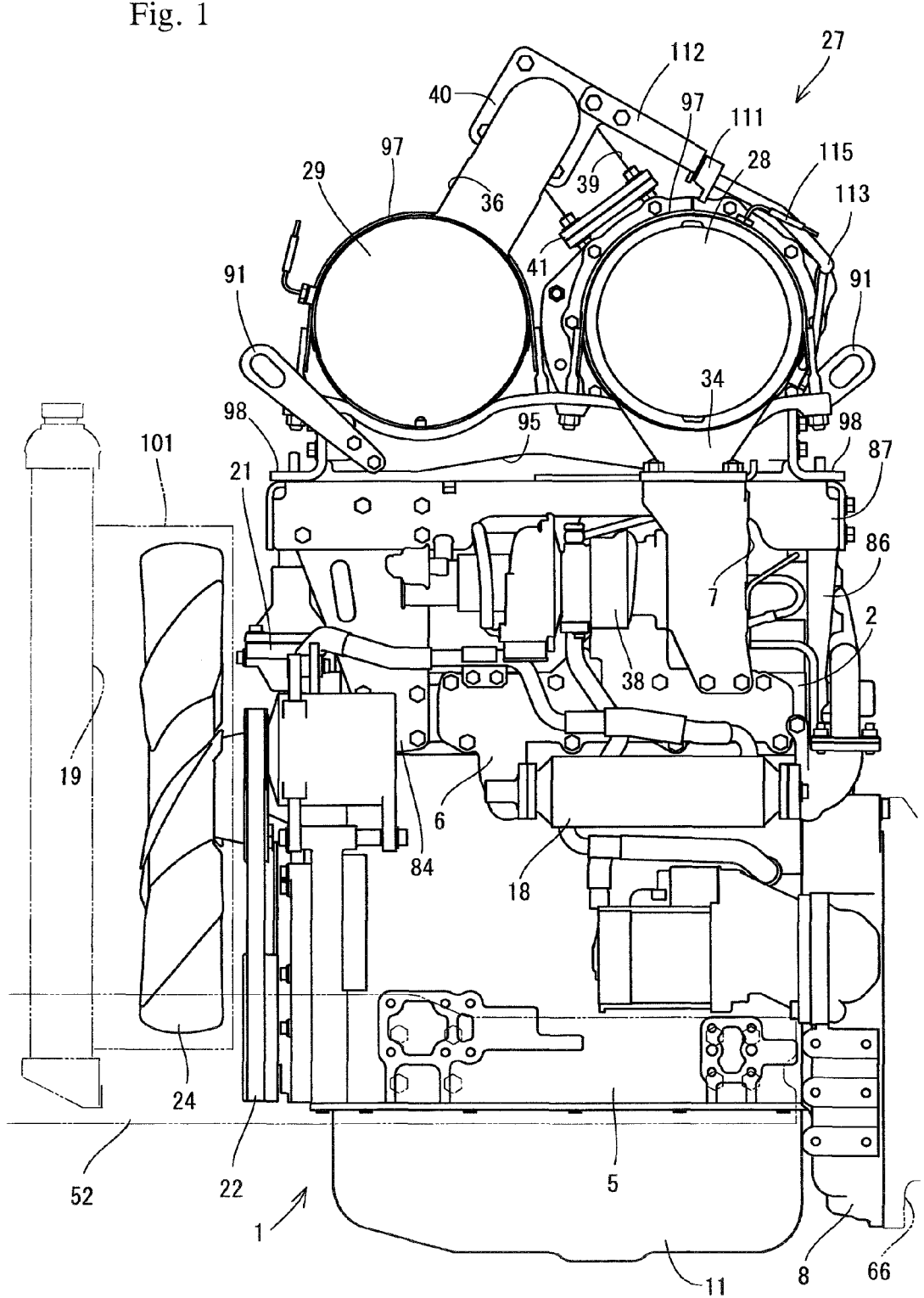
FIG. 1 is a left side view of a diesel engine illustrating a first embodiment.
Figure 2:
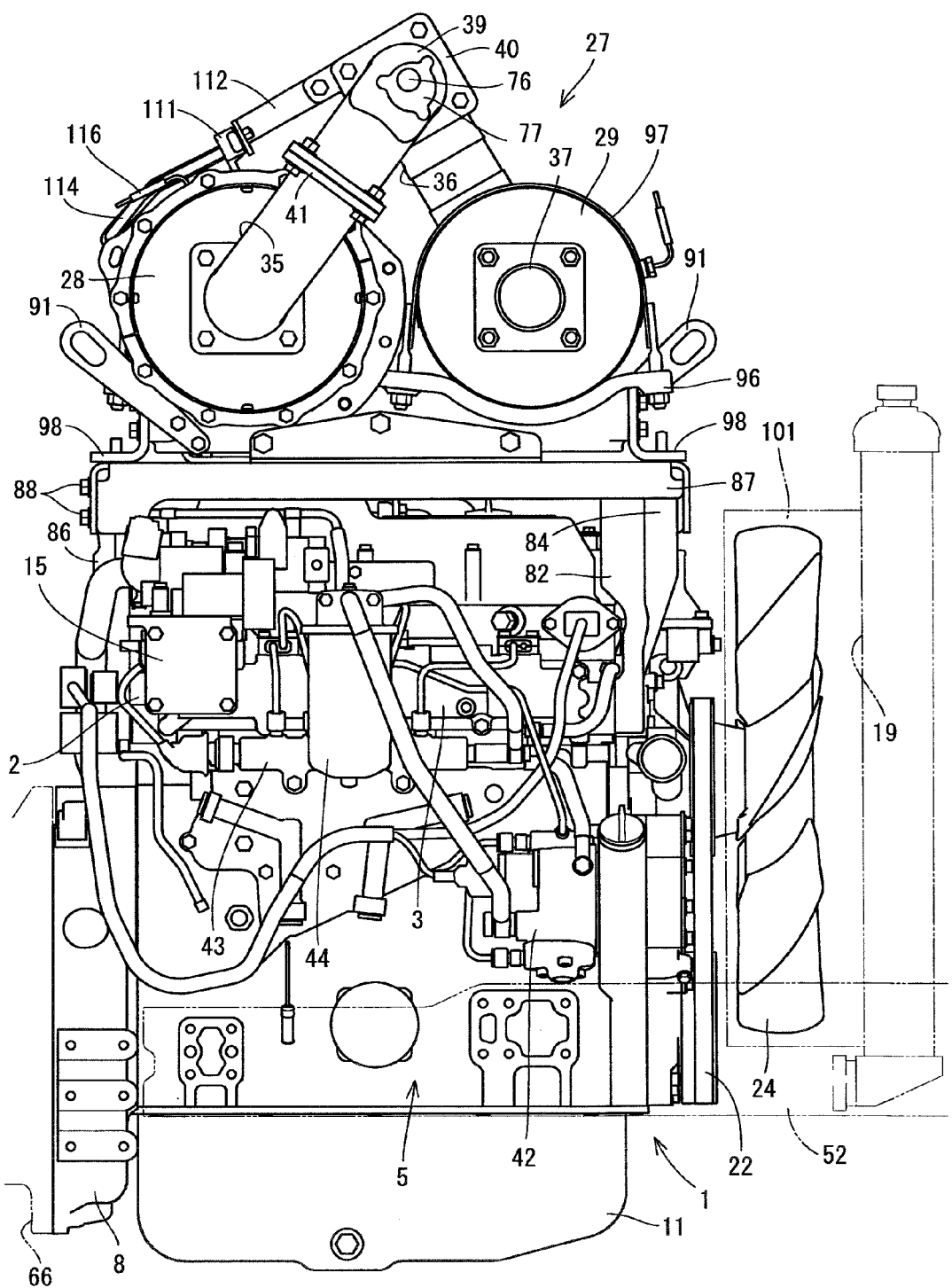
FIG. 2 is a right side view of the diesel engine.
Figure 3:
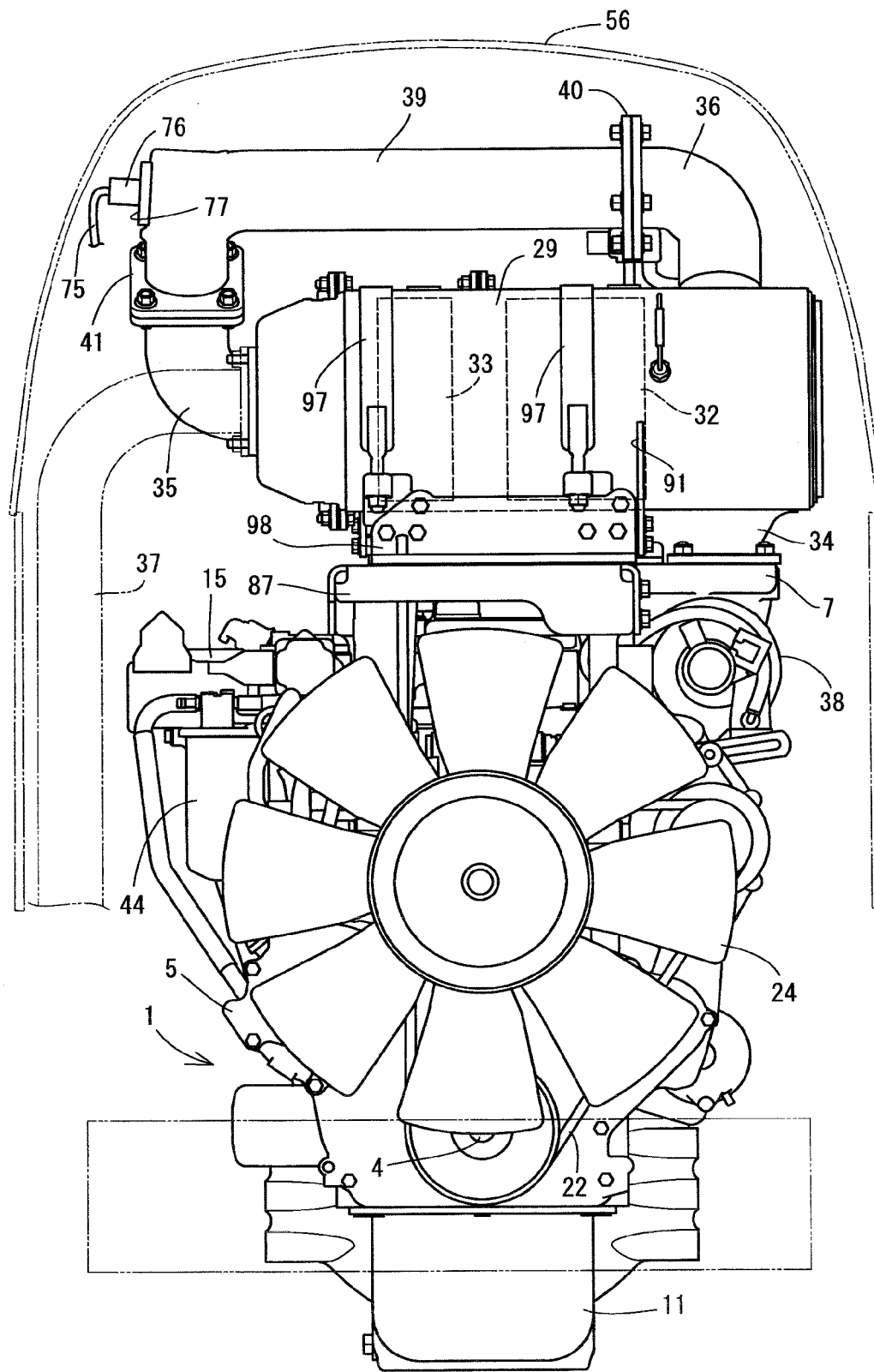
FIG. 3 is a front view of the diesel engine.

Hereinafter, a first embodiment, which is an embodiment of the present invention, will be described based on drawings (FIGS. 1 to 12). FIG. 1 is a left side view of a diesel engine 1 in which an exhaust manifold 6 is installed, and FIG. 2 is a right side view of the diesel engine 1 in which an intake manifold 3 is installed, and FIG. 3 is a front view of the diesel engine 1 in which a cooling fan 24 is installed. It is noted that the installation side of the exhaust manifold 6 is referred to as the left lateral surface of the diesel engine 1, and the installation side of the intake manifold 3 is referred to as the right lateral surface of the diesel engine 1, and the installation side of the cooling fan 24 is referred to as the front surface of the diesel engine 1. The entire structure of the diesel engine 1 will be described referring to FIGS. 1 to 8.

As illustrated in FIGS. 1 to 7, the intake manifold 3 is arranged on one side surface of a cylinder head 2 of the diesel engine 1. The cylinder head 2 is mounted on a cylinder block 5 in which an engine output shaft 4 (crankshaft) and pistons (not illustrated) are incorporated. The exhaust manifold 6 is arranged on the other side surface of the cylinder head 2. The front end and the rear end of the engine output shaft 4 protrude from the front surface and the rear surface of the cylinder block 5.

As illustrated in FIGS. 1 to 7, a flywheel housing 8 is adhered to the rear surface of the cylinder block 5. A flywheel 9 is provided in the flywheel housing 8. The flywheel 9 is pivotably supported on the rear end side of the engine output shaft 4. It is configured such that the motive power of the diesel engine 1 is taken out via the flywheel 9. Furthermore, an oil pan 11 is arranged on the lower surface of the cylinder block 5.

As illustrated in FIGS. 2 to 5 and 7, an exhaust gas recirculation device (EGR) 15 that takes in the exhaust gas for recirculation is arranged on the intake manifold 3. An air cleaner 16 (see FIG. 13) is connected to the intake manifold 3. It is configured such that outside air that is purified by removing dust by means of the air cleaner 16 is delivered to the intake manifold 3 and supplied to each cylinder of the diesel engine 1.

With the aforementioned constitution, part of the exhaust gas discharged from the diesel engine 1 to the exhaust manifold 6 is recirculated from the intake manifold 3 into each cylinder of the diesel engine 1 via the exhaust gas recirculation device 15, thereby reducing the combustion temperature of the diesel engine 1, reducing the emissions of nitrogen oxides (NOx) from the diesel engine 1, and improving the fuel consumption of the diesel engine 1.

It is noted that a coolant pump 21 for circulating a coolant to the cylinder block 5 and a radiator 19 (see FIG. 13) is provided. The coolant pump 21 is arranged on the installation side of the cooling fan 24 of the diesel engine 1. The coolant pump 21 and the cooling fan 24 are coupled with the engine output shaft 4 via a V belt 22 and the like, thereby driving the coolant pump 21 and the cooling fan 24. It is configured such that the coolant is delivered from the coolant pump 21 into the cylinder block 5 via an EGR cooler 18 of the exhaust gas recirculation device 15, while the diesel engine 1 is cooled by the wind of the cooling fan 24.

As illustrated in FIGS. 1 to 8, the diesel engine 1 includes a first case 28 as a diesel particulate filter (DPF) that removes particulate matter in the exhaust gas of the diesel engine 1 and a second case 29 as a urea selective catalyst reduction (SCR) system that removes the nitrogen oxides in the exhaust gas of the diesel engine 1, as an exhaust gas purification device 27 for purifying the exhaust gas discharged from each cylinder of the diesel engine 1. As illustrated in FIGS. 1 and 2, an oxidation catalyst 30 and a soot filter 31 are internally provided in the first case 28 as a DPF case. An SCR catalyst 32 and an oxidation catalyst 33 for urea selective catalyst reduction are internally provided in the second case 29 as an SCR case.

The exhaust gas discharged from each cylinder of the diesel engine 1 to the exhaust manifold 6 is released to the outside via the exhaust gas purification device 27 and the like. It is configured such that carbon monoxide (CO), hydrocarbon (HC), particulate matter (PM), and nitrogen oxides (NOx) in the exhaust gas of the diesel engine 1 are reduced by means of the exhaust gas purification device 27.

Figure 4:
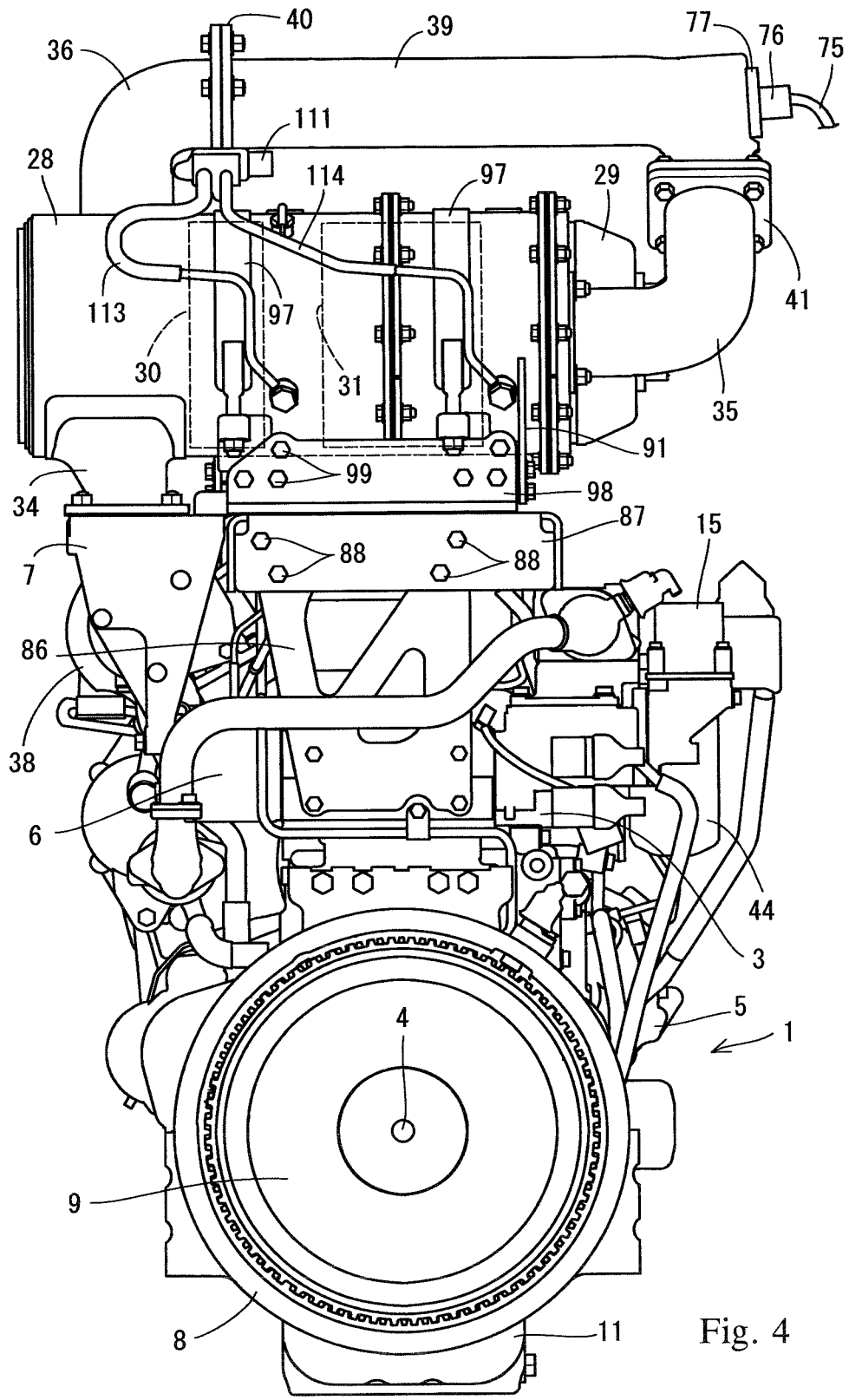
FIG. 4 is a rear view of the diesel engine.
Figure 5:
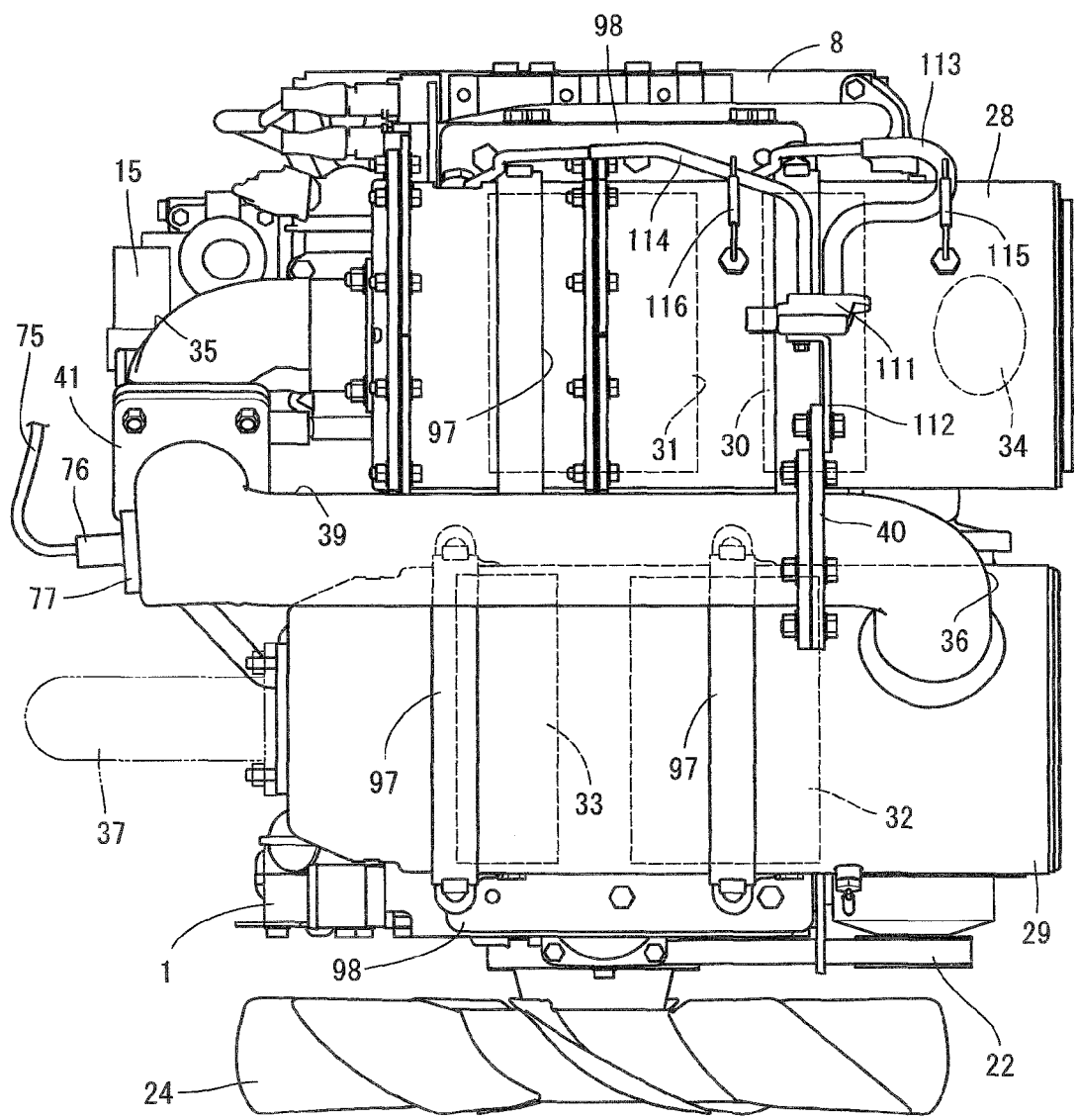
FIG. 5 is a plan view of the diesel engine.
Figure 6:
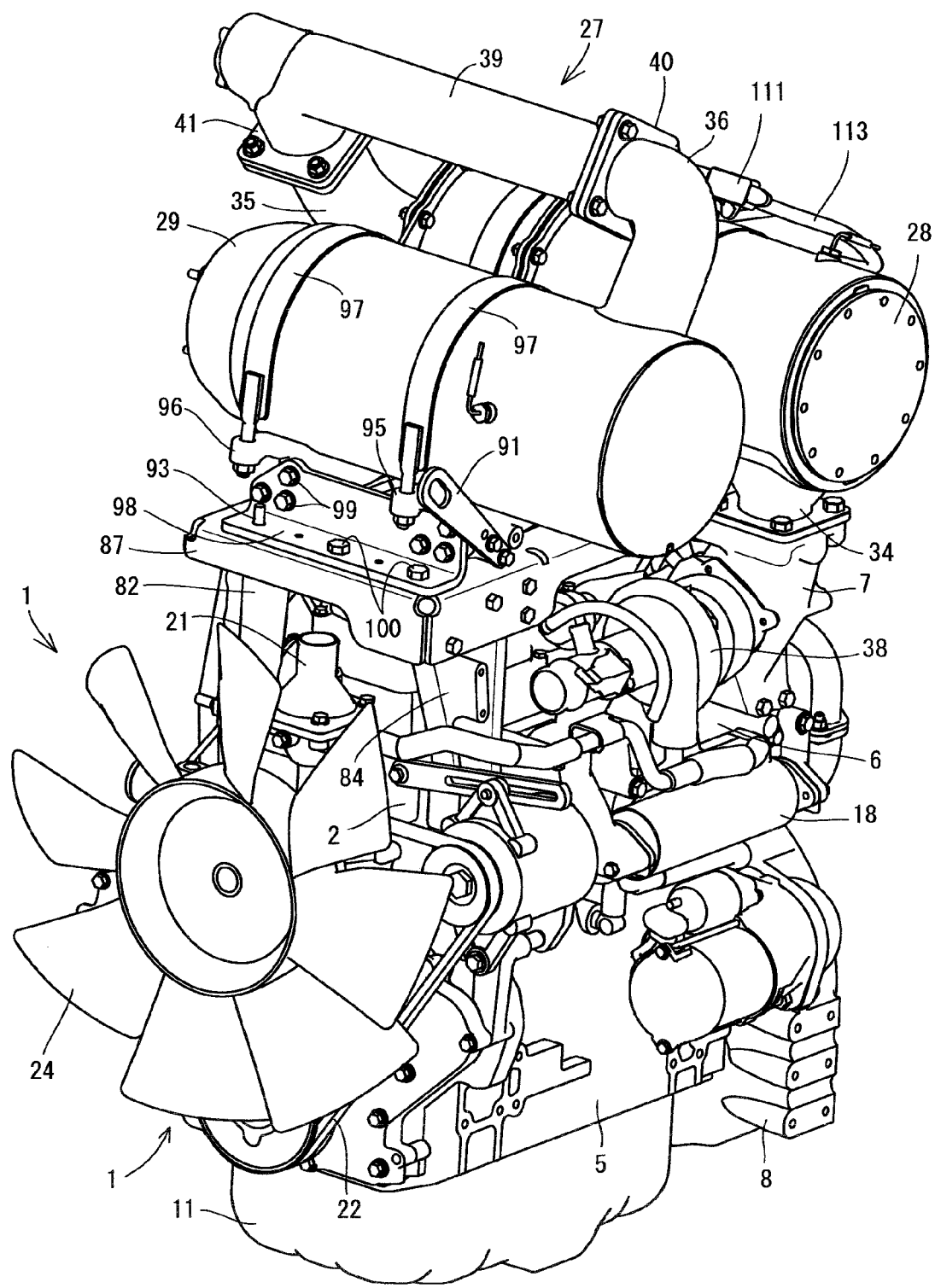
FIG. 6 is a perspective front view of the diesel engine.
Figure 7:
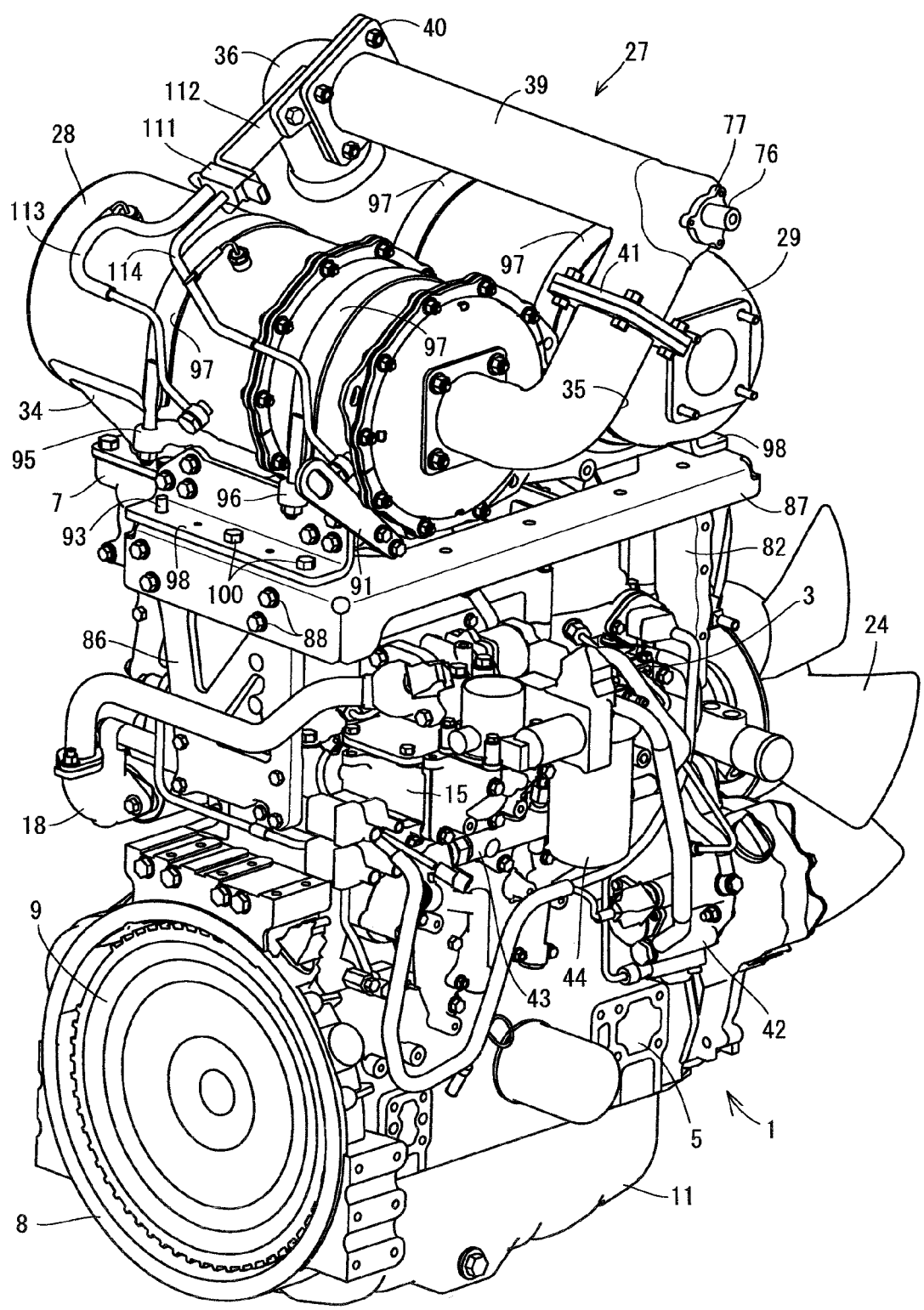
FIG. 7 is a perspective rear view of the diesel engine.
Figure 8:
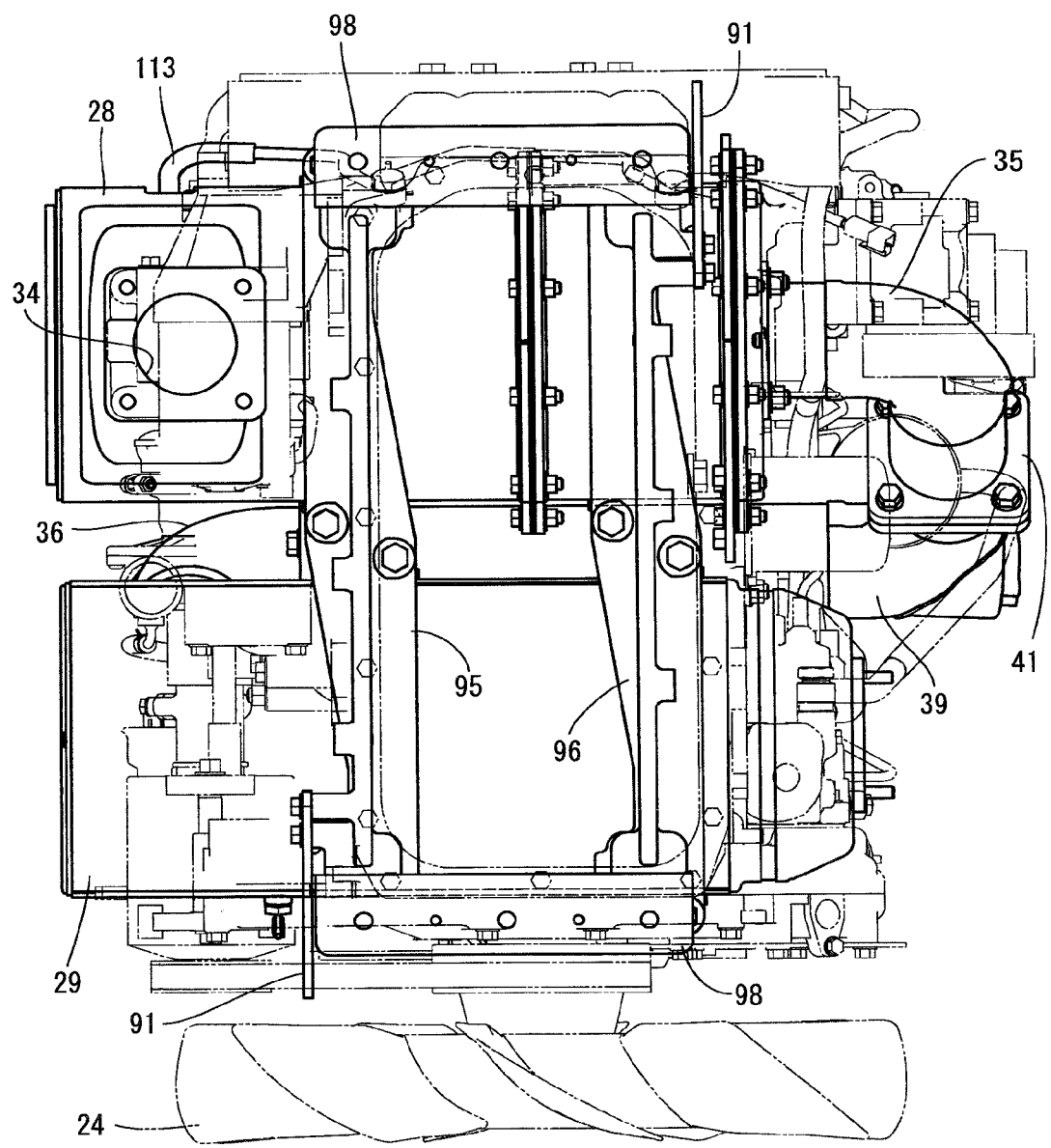
FIG. 8 is an explanatory bottom view of an exhaust gas purification unit body.
Figure 9:
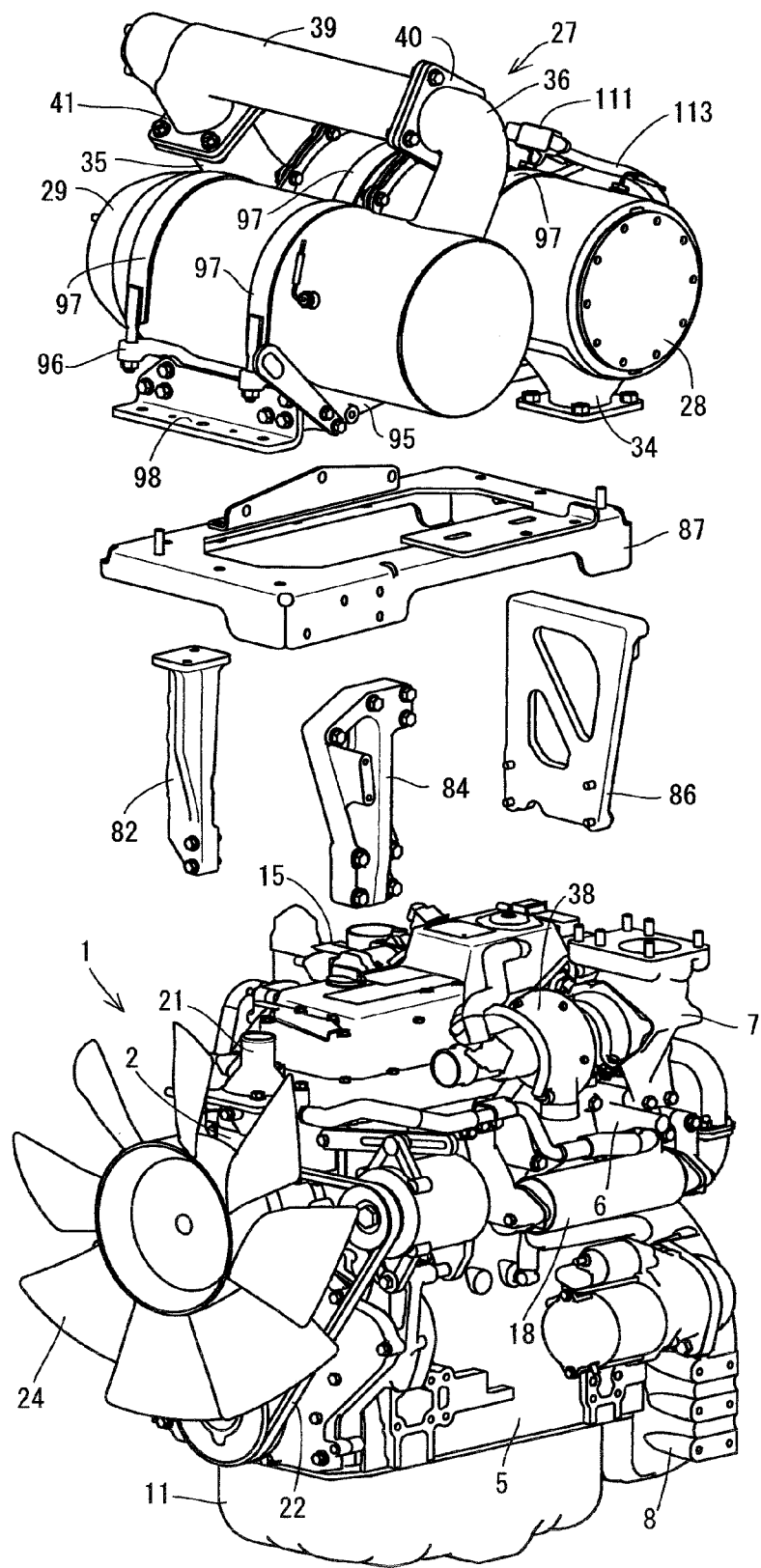
FIG. 9 is a perspective exploded front view of the exhaust gas purification unit body.
Figure 10:
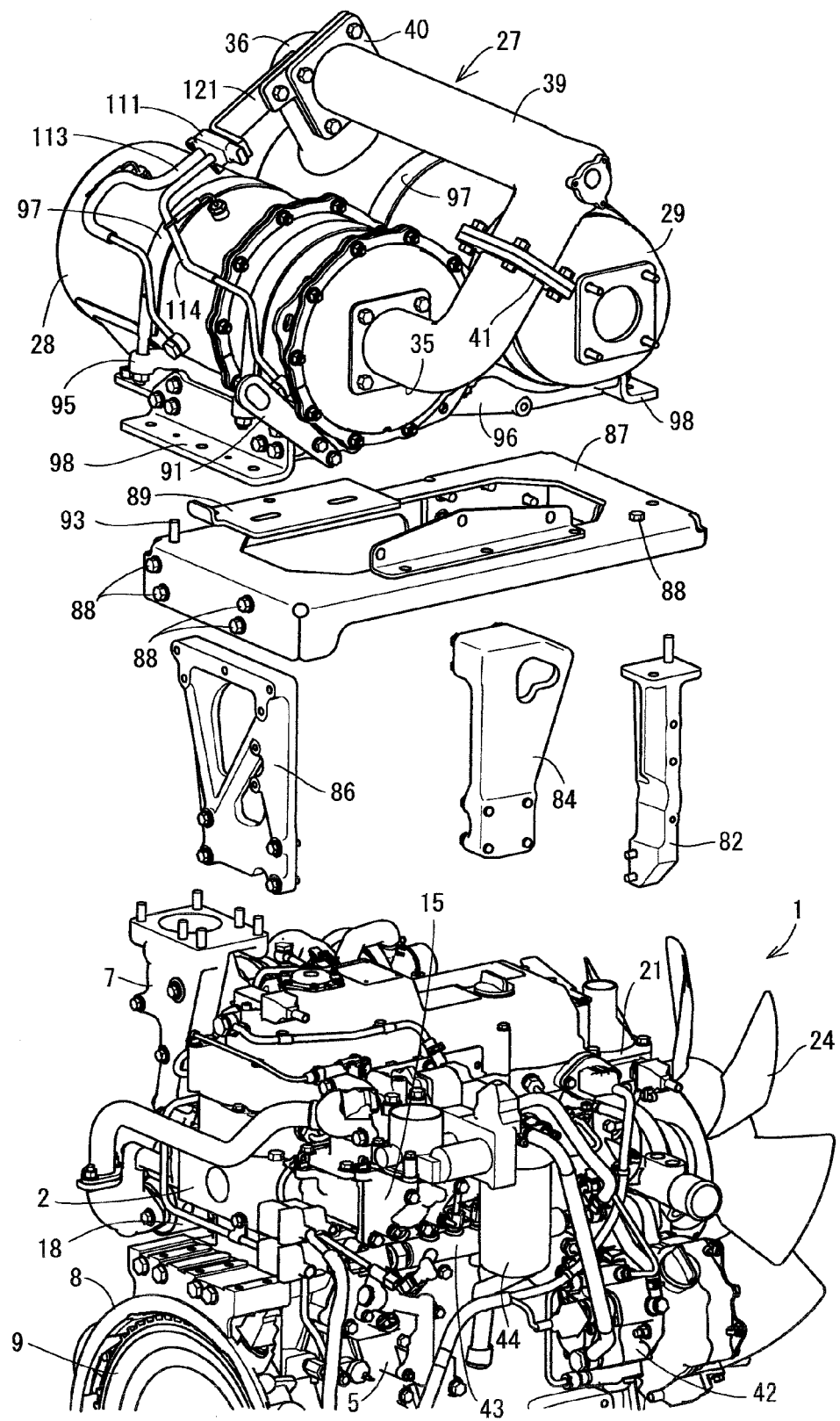
FIG. 10 is a perspective exploded rear view of the exhaust gas purification unit body.
Figure 11:
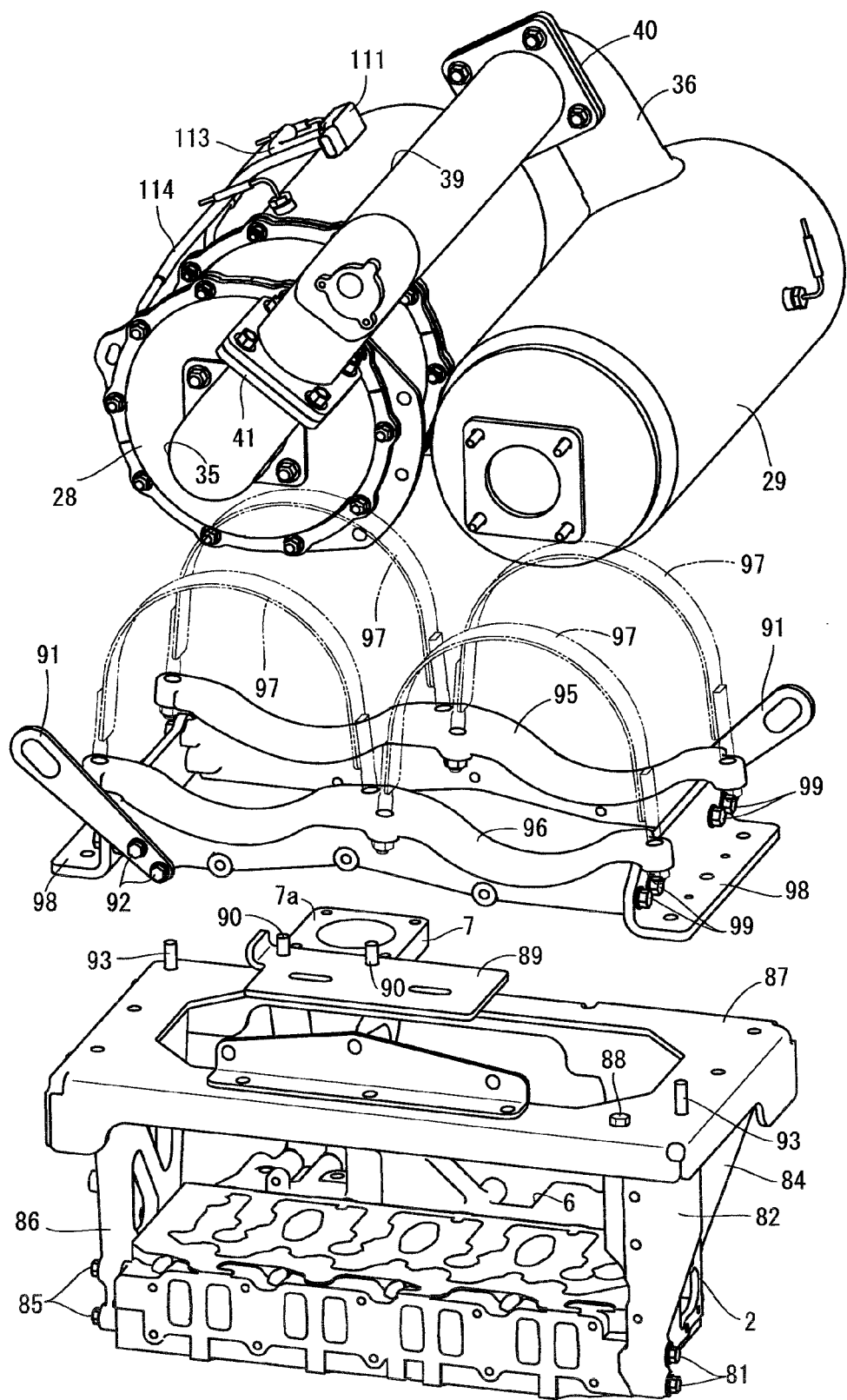
FIG. 11 is a perspective exploded right side view of the exhaust gas purification unit body.
Figure 12:
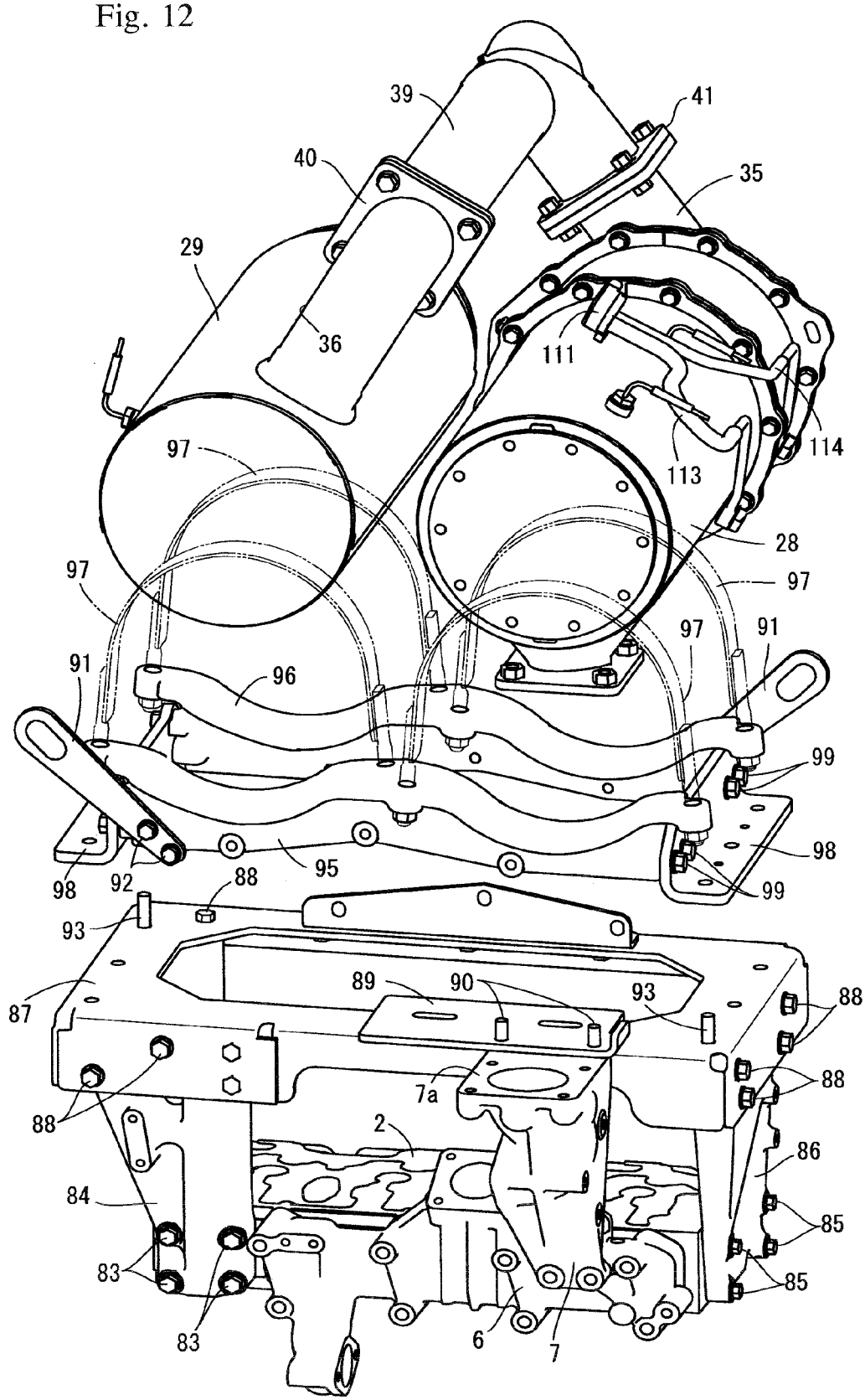
FIG. 12 is a perspective exploded left side view of the exhaust gas purification unit body.

The first case 28 and the second case 29 are constituted in a lateral, oblong cylindrical shape elongated in the orthogonal direction intersecting with the output shaft (crankshaft) 4 of the diesel engine 1 when viewed from a plane (see FIGS. 3 to 5). A DPF inlet pipe 34 that takes in the exhaust gas and a DPF outlet pipe 35 that discharges the exhaust gas are provided on the cylindrical bilateral sides (one end side and the other end side of the transfer direction of the exhaust gas) of the first case 28. Similarly, an SCR inlet pipe 36 that takes in the exhaust gas and an SCR outlet pipe 37 that discharges the exhaust gas are provided on the bilateral sides (one end side and the other end side of the transfer direction of the exhaust gas) of the second case 29.

Also, a supercharger 38 that forcibly feeds air into the diesel engine 1, and an exhaust gas outlet pipe 7 fastened with bolts to the exhaust manifold 6 are arranged at the exhaust gas outlet of the exhaust manifold 6. It is configured such that the DPF inlet pipe 34 communicates with the exhaust manifold 6 via the supercharger 38 and the exhaust gas outlet pipe 7, and the exhaust gas of the diesel engine 1 is introduced into the first case 28, while the SCR inlet pipe 36 is connected to the DPF outlet pipe 35 via a urea mixing pipe 39, and the exhaust gas of the first case 28 is introduced into the second case 29. In addition, the DPF outlet pipe 35 and the urea mixing pipe 39 are detachably connected by fastening with bolts on a DPF outlet-side flange body 41. It is noted that the SCR inlet pipe 36 and the urea mixing pipe 39 are detachably connected on an SCR inlet-side flange body 40.

Figure 13:
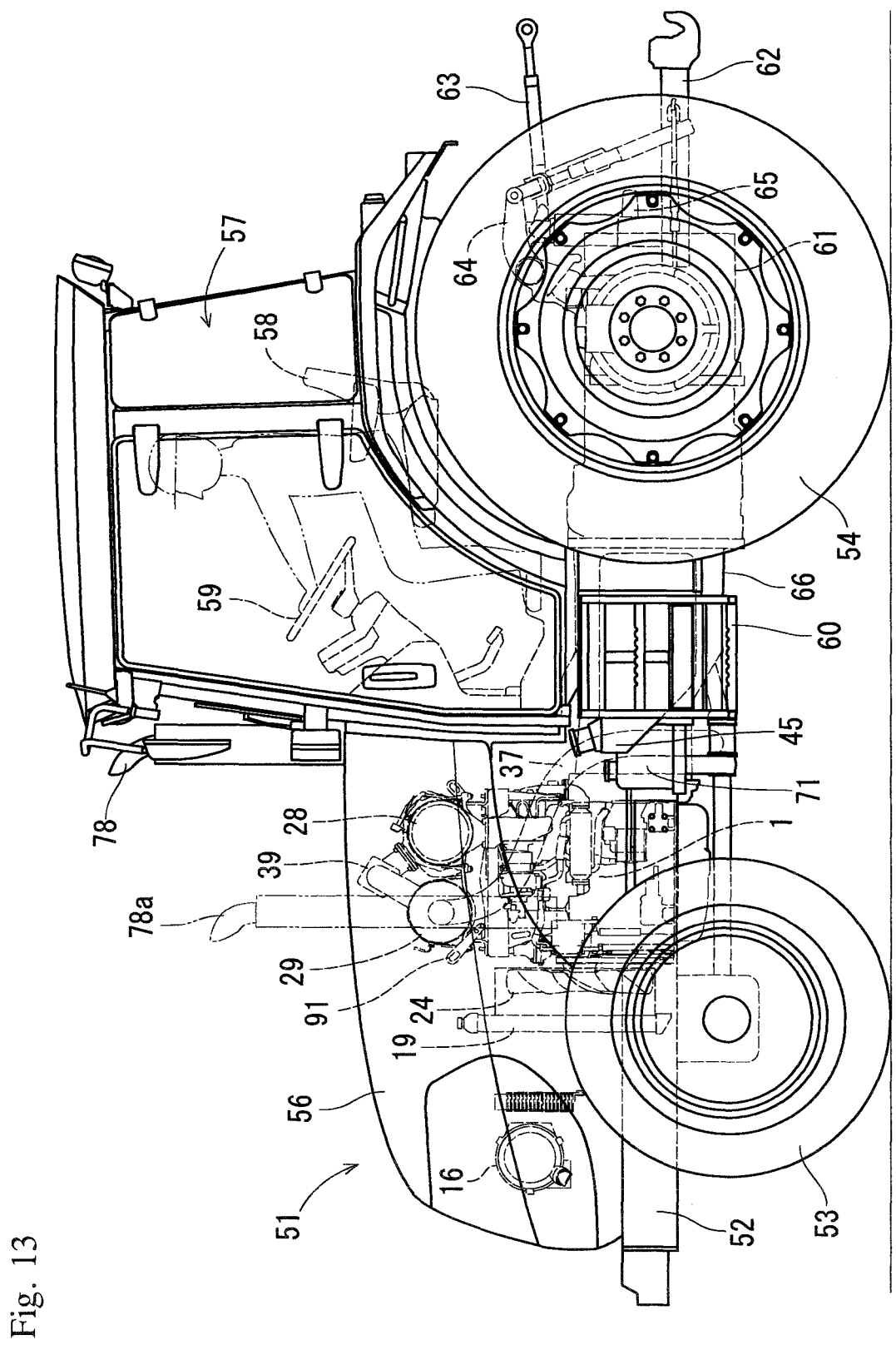
FIG. 13 is a left side view of a tractor in which the diesel engine is mounted.

As illustrated in FIG. 2, a fuel pump 42 and a common rail 43 that are connected to a fuel tank 45 illustrated in FIG. 13 (FIG. 14) are provided in respective injectors (not illustrated) corresponding to the multi cylinders of the diesel engine 1. The common rail 43 and a fuel filter 44 are arranged on the installation side of the intake manifold 3 of the cylinder head 2, and the fuel pump 42 is arranged in the cylinder block 5 below the intake manifold 3. It is noted that each injector includes a fuel injection valve (not illustrated) of an electromagnetic opening/closing control type.

The fuel in the fuel tank 45 is drawn in by the fuel pump 42 via the fuel filter 44, while the common rail 43 is connected to the discharge side of the fuel pump 42, and the cylindrical common rail 43 is connected to each injector of the diesel engine 1. It is noted that surplus fuel, out of the fuel that is pressure-fed from the fuel pump 42 to the common rail 43, is returned to the fuel tank 45, and the high-pressure fuel is temporarily retained in the common rail 43, and the high-pressure fuel in the common rail 43 is supplied into the interior of each cylinder (cylinder) of the diesel engine 1.

With the aforementioned constitution, the fuel in the fuel tank 45 is pressured-fed to the common rail 43 by means of the fuel pump 42, and the high-pressure fuel is stored in the common rail 43, and the fuel injection valves of the injectors are respectively controlled in an openable/closable manner, thereby injecting the high-pressure fuel in the common rail 43 into the injectors of the diesel engine 1. That is, the fuel injection valve of each injector is electronically controlled, so that the injection pressure, injection time, and injection period (injection amount) of the fuel can be controlled with high accuracy. Accordingly, the nitride oxides (NOx) discharged from the diesel engine 1 can be reduced.

Figure 14:
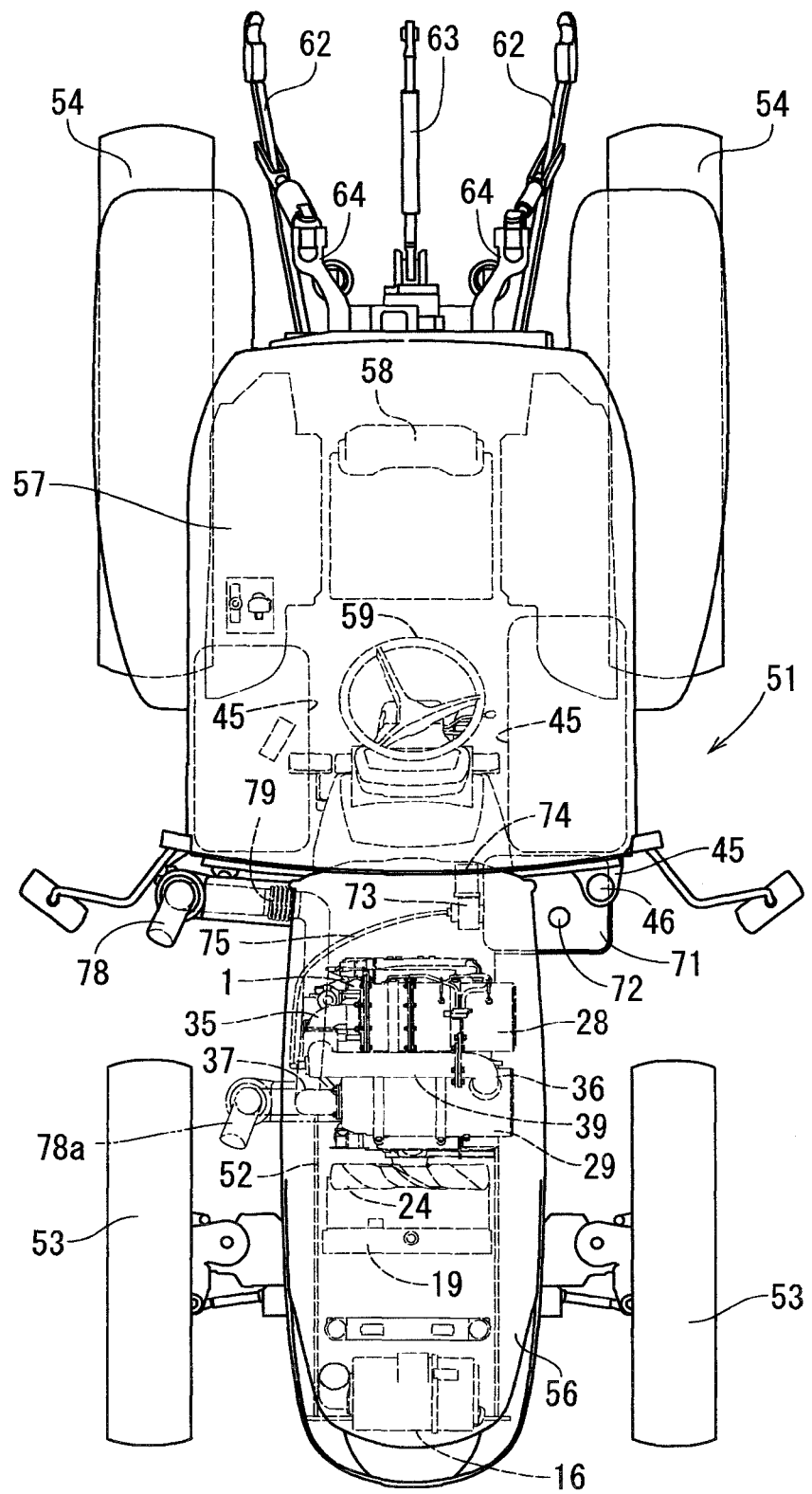
FIG. 14 is a plan view of the tractor.
Figure 15:
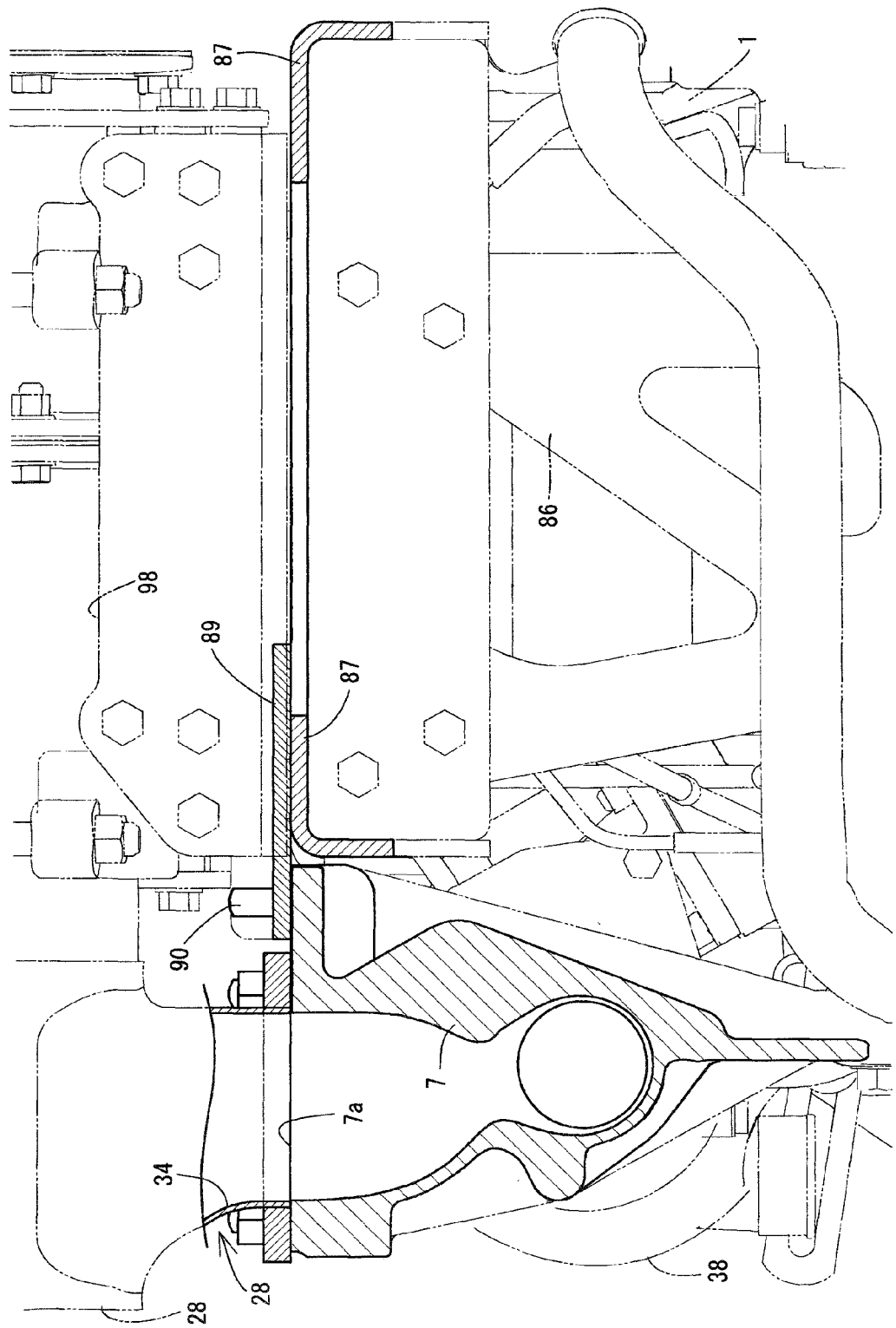
FIG. 15 is a cross-sectional rear view of a supporting stand portion of the exhaust gas purification unit body.
Figure 16:
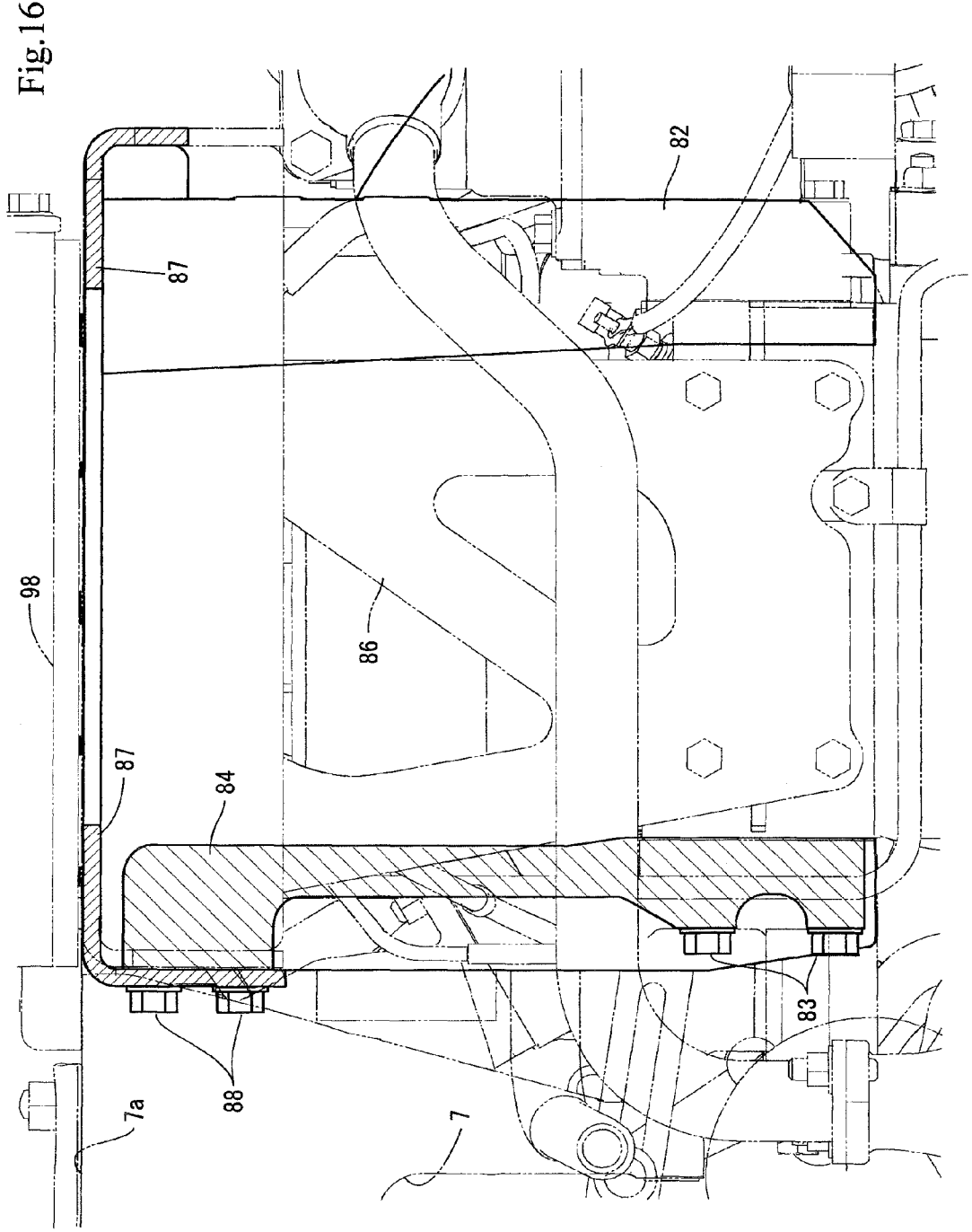
FIG. 16 is a cross-sectional rear view of a supporting leg body portion of the exhaust gas purification unit body.
Figure 17:
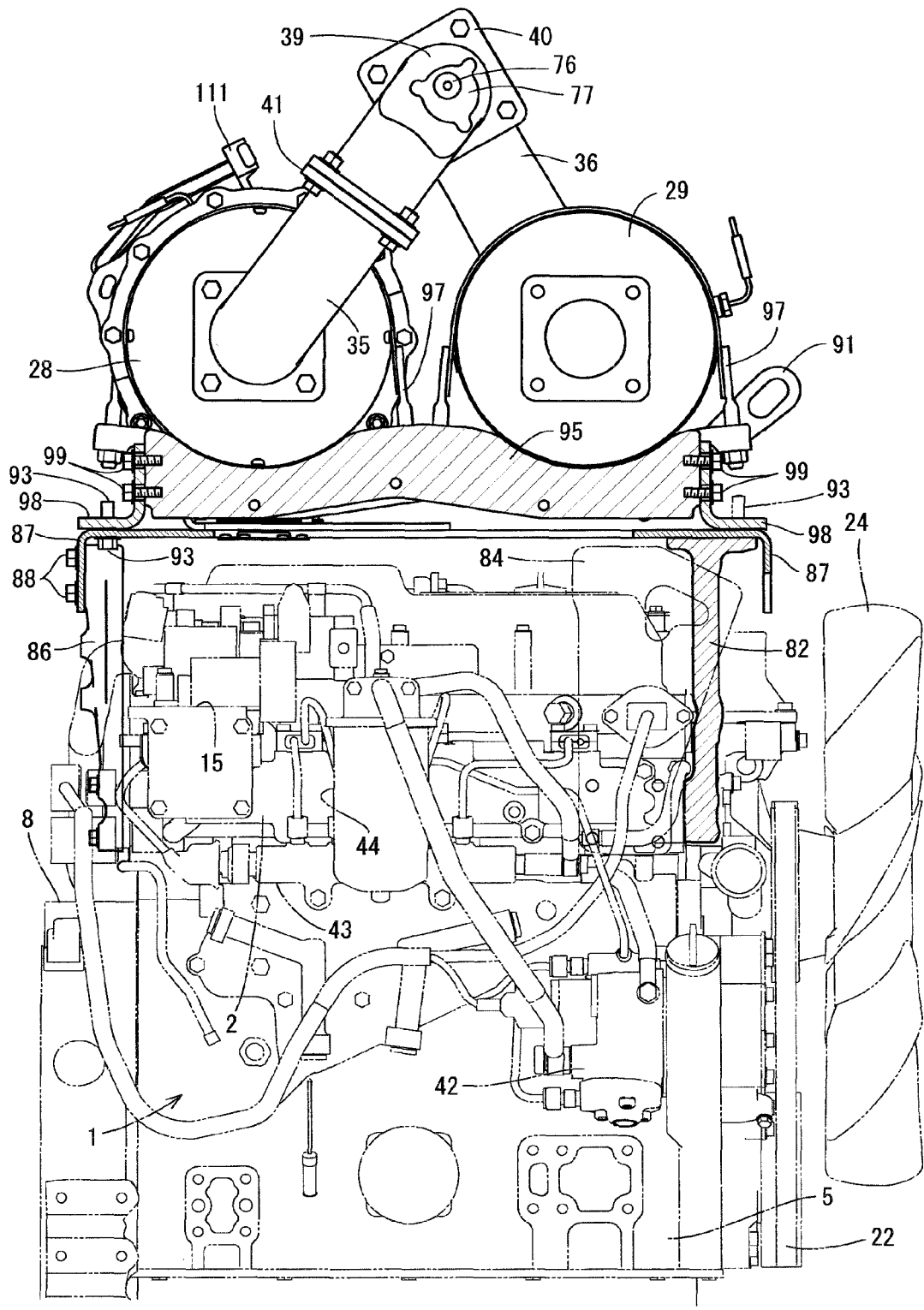
FIG. 17 is a cross-sectional rear view of a case mounting frame body portion of the exhaust gas purification unit body.

Next, a tractor 51 on which the diesel engine 1 is mounted will be described referring to FIGS. 13 and 14. The tractor 51 as a work vehicle illustrated in FIGS. 13 and 14 is configured to be equipped with a tilling machine not illustrated and perform tillage so as to till farm fields. FIG. 13 is a side view of a tractor for farm work, and FIG. 14 is a plan view of the tractor. It is noted that, in the description below, a left side with respect to the advance direction of the tractor is merely referred to as "left side", and a right side with respect to the advance direction of the tractor is merely referred to as "right side".

As illustrated in FIGS. 13 and 14, the tractor 51 for farm work as a work vehicle is configured such that a travelling vehicle body 52 is supported by a pair of right and left front wheels 53 and a pair of right and left rear wheels 54, and the diesel engine 1 is mounted on the front portion of the travelling vehicle body 52, and the front wheels 53 and the rear wheels 54 are driven by the diesel engine 1, which allows the tractor 51 to travel forward and backward. The upper surface side and the right and left lateral surface sides of the diesel engine 1 are covered by an openable/closable hood 56.

Also, a cabin 57 that an operator rides on is installed in the rear of the hood 56 on the upper surface of the travelling vehicle body 52. A maneuvering seat 58 that the operator takes, and maneuvering instruments such as a maneuvering handle 59 as a steering means are provided in the interior of the cabin 57. Also, a pair of right and left steps 60 that the operator ascends or descends are provided on the right and left external lateral sections of the cabin 57, and the fuel tank 45 for supplying the fuel to the diesel engine 1 is provided on the inner side of the steps 60 and on the lower side with respect to the bottom portion of the cabin 57.

Also, the travelling vehicle body 52 includes a mission case 61 for shifting the output from the diesel engine 1 and transmitting the output to the rear wheels 54 (front wheels 53). The tilling machine not illustrated or the like is coupled with the rear portion of the mission case 61 in such a manner as to be capable of being hoisted and lowered via a lower link 62, a top link 63, a lift arm 64, and the like. Furthermore, a PTO shaft 65 for driving the tilling machine and the like is provided on the rear lateral surface of the mission case 61. It is noted that the travelling vehicle body 52 of the tractor 51 is constituted by the diesel engine 1, the mission case 61, and a clutch case 66 that couples the diesel engine 1 with the mission case 61.

Furthermore, the mounting structure of the first case 28 and the second case 29 will be described referring to FIGS. 1 to 12 and 15 to 17. As illustrated in FIGS. 9 to 12 and 15 to 17, a front portion supporting leg body 82 that fastens a lower end side with bolts 81 to a right side corner section on the front surface of the cylinder head 2, a lateral portion supporting leg body 84 that fastens a lower end side with bolts 83 to a front side corner section on the left side surface of the cylinder head 2, and a rear portion supporting leg body 86 that fastens a lower end side with bolts 85 to a rear surface of the cylinder head 2 are included, and each of the supporting leg bodies 82, 84, and 86 is vertically installed in the cylinder head 2. A rectangular supporting stand 87 formed by sheet metal working is included, and the lateral surface and the upper surface side of the supporting stand 87 are fastened with bolts 88 to the upper end side of the supporting leg bodies 82, 84, and 86. Also, a tabular positioning body 89 is welded and fixed on the upper surface of the supporting stand 87 installed opposite to the exhaust gas outlet pipe 7, and part of the tabular lower surface of the positioning body 89 is brought in surface contact with part of a flat exhaust gas outlet surface 7*a* of the exhaust gas outlet pipe 7 opened upwardly, and the positioning body 89 is fastened with bolts 90 to the exhaust gas outlet pipe 7. It is configured that the surface contact of the positioning body 89 with the exhaust gas outlet pipe 7 allows the upper surface of the supporting stand 87 to be approximately horizontal to the diesel engine 1.

As illustrated in FIGS. 11 and 12, and 15 to 17, a pair of left case fixing body 95 and right case fixing body 96, and four fastening bands 97 are included as a clamping body for arranging the first case 28 and the second case 29 in parallel. The first case 28 is adhered with the right and left fastening bands 97 to rear side placement portions of the left case fixing body 95 and the right case fixing body 96, and the second case 29 is adhered with the right and left fastening bands 97 to front side placement portions of the left case fixing body 95 and the right case fixing body 96. Accordingly, the first case 28 and the second case 29, each of which is formed in an oblong cylindrical shape elongated in the right-and-left direction, are arranged in parallel to the upper surface side of the diesel engine 1, so that the first case 28 is positioned on the rear side of the upper surface of the diesel engine 1, and the second case 29 is positioned on the front side of the upper surface of the diesel engine 1.

As illustrated in FIGS. 9 to 12, and 17, as an exhaust gas purification unit, the exhaust gas purification device 27 is configured such that a front and back supporting frame bodies 98 are fastened with bolts 99 to the front-and-back end portions of the left case fixing body 95 and the right case fixing body 96 in such a manner that a mounting position (supporting posture) can be adjusted, and the left case fixing body 95 and the right case fixing body 96 and the front and back supporting frame bodies 98 are coupled in a rectangular frame shape, and the first case 28 and the second case 29 are adhered to the left case fixing body 95, the right case fixing body 96, and the front and back supporting frame bodies 98 via the right and left fastening bands 97. It is noted that the internal diameter size of the bolt through-hole of the front and back supporting frame bodies 98 is formed larger, compared with the external diameter size of the bolts 99, and the bolts 99 are inserted into the bolt through-holes of the front and back supporting frame bodies 98 in a freely fittable manner, and it is configured that when the case fixing bodies 95 and 96 are adhered to the front and back supporting frame bodies 98, while the coupling posture of the front and back supporting frame bodies 98 with respect to the case fixing bodies 95 and 96 is supported in a predetermined posture, the case fixing bodies 95 and 96 are threadedly engaged with the bolts 99, and the supporting frame bodies 98 are fastened with the bolts 99 to the case fixing bodies 95 and 96.

Also, right and left hanging members 91 are fastened with bolts 92 to the front end side of the left case fixing body 95 and the rear end side of the right case fixing body 96, and the right and left hanging members 91 are arranged at diagonal positions of a rectangular frame of the case fixing bodies 95 and 96 and the front and back supporting frame bodies 98. In contrast, front and rear temporal fixing bolt bodies 93 are vertically installed on the upper surface of the supporting stand 87 disposed approximately horizontally, and the front and rear temporal fixing bolt bodies 93 are arranged at diagonal arrangements of the right and left hanging members 91 and at diagonal positions on the opposite side. That is, the right and left hanging members 91 and the front and rear temporal fixing bolt bodies 93 are allocated and arranged at vertical angle portions of the rectangular frame of the case fixing bodies 95 and 96 and the front and back supporting frame bodies 98.

Next, the assembly procedure of assembling the exhaust gas purification device 27 (the exhaust purification unit) in the diesel engine 1 will be described. As illustrated in FIGS. 9 to 12, first, in assembling the exhaust gas purification device (the exhaust purification unit) 27, a pair of supporting frame bodies 98 made of sheet metal, whose end surface is formed in an L shape, are fastened with the bolts 99 to both end portions of the left case fixing body (clamping body) 95 and the right case fixing body (clamping body) 96. When the bolts 99 are tightened, looseness between the bolt hole of each supporting frame body 98 and the bolt 99 is utilized in such a manner that the height of the upper surface of the left case fixing body 95 is flush with the height of the upper surface of the right case fixing body 96, and the bolts 99 are tightened while the coupling positions of the case fixing bodies 95 and 96 and the supporting frame bodies 98 are adjusted, and the case fixing bodies 95 and 96 and the supporting frame bodies 98 are coupled in a rectangular frame shape.

Subsequently, the first case 28 and the second case 29 are placed in a predetermined direction (parallel) on upward-directed concave supporting portions on the upper surface side of the case fixing bodies 95 and 96, and the DPF outlet-side flange body 41 is fastened with bolts to the DPF outlet pipe 35, and other end side of the urea mixing pipe 39 is fastened with bolts to the SCR inlet pipe 36 via the SCR inlet-side flange body 40, and the first case 28, the second case 29, and the urea mixing pipe 39 are integrally combined. Then, two fastening bands 97 are respectively mounted in a half wound form on each upper surface side of the first case 28 and the second case 29, and the lower end side of each fastening band 97 is fastened with bolts to each of the case fixing bodies 95 and 96, and the hanging members 91 are fastened with the bolts 92 to each of the case fixing bodies 95 and 96, thereby completing the assembly of the exhaust gas purification device 27. It is noted that when the SCR inlet-side flange body 40 is fastened with bolts, a sensor bracket 112 is also fastened with bolts to the SCR inlet-side flange body 40, and a differential pressure sensor 111 is mounted on the sensor bracket 112.

On the other hand, in the neighborhood of a final assembly process of an assembly line (engine assembly site) of the diesel engine 1, respective lower end sides of the front portion supporting leg body 82, the lateral portion supporting leg body 84, and the rear portion supporting leg body 86 are fastened with the bolts 81, 83, and 85 to the cylinder head 2 of the diesel engine 1 for which the assembly work is approximately completed, and each of the supporting leg bodies 82, 84, and 86 is vertically installed in the cylinder head 2. Subsequently, the supporting stand 87 is placed on the upper end side of each of the supporting leg bodies 82, 84, and 86, and the lower surface of the positioning body 89 is brought in surface contact with the exhaust gas outlet surface 7a of the exhaust gas outlet pipe 7, and the supporting stand 87 is fastened with the bolts 88 to each of the supporting leg bodies 82, 84, and 86 in a state where the upper surface of the supporting stand 87 is supported approximately horizontally, and the supporting stand 87 is fixed in a horizontal posture on the upper surface side of the diesel engine 1.

Furthermore, at a work site in the neighborhood of the final assembly process of the diesel engine 1, the exhaust gas purification device 27, for which the assembly is completed as described above, is suspended on a loading-and-unloading device (hoist or chain block) not illustrated via the hanging members 91 and transferred to the upper surface side of the diesel engine 1 in which the supporting stand 87 is assembled as described above, and the front and back supporting frame bodies 98 are placed from the upper side on the approximately horizontal upper surface of the supporting stand 87 via the front and rear temporal fixing bolt bodies 93, and the front and back supporting frame bodies 98 are fastened with bolts 100 to the supporting stand 87, and the exhaust gas purification device 27 (the first case 28 and the second case 29) is united on the upper surface side of the diesel engine 1, thereby completing the assembly work in which the exhaust gas purification device 27 is assembled into the diesel engine 1.

Also, the urea mixing pipe 39 is arranged between the first case 28 and the second case 29, in parallel to the first case 28 and the second case 29. The first case 28, the second case 29, and the urea mixing pipe 39 are supported at a high position with respect to the cooling air path (shroud 101 illustrated in FIG. 1) of the cooling fan 24 via the upper surface of the supporting stand 87, and the front side of the urea mixing pipe 39 is blocked with the second case 29. Urea water supplied in the urea mixing pipe 39 is prevented from being crystallized, which is attributed to the reduction of the exhaust gas temperature in the urea mixing pipe 39 that is caused by the cooling wind of the cooling fan 24. Also, it is configured such that the urea water supplied in the urea mixing pipe 39 is mixed into the exhaust gas leading from the first case 28 to the second case 29 as ammonia.

As illustrated in FIGS. 1 to 12, regarding the engine device for the work vehicle that includes the first case 28 that removes the particulate matter in the exhaust gas of the diesel engine 1 and the second case 29 that removes the nitrogen oxides in the exhaust gas of the diesel engine 1 and connects the first case 28 to the second case 29 via the urea mixing pipe 39, the engine device includes the case fixing bodies 95 and 96 for adhering to the first case 28 and the second case 29, and the hanging members 91 are adhered to the case fixing bodies 95 and 96. Accordingly, in a state where the first case 28 and the second case 29 are integrally assembled by means of the case fixing bodies 95 and 96 as the exhaust gas purification device (the exhaust purification unit) 27, the exhaust purification unit 27 can be hanged and supported by the loading-and-unloading device and the like via the hanging members 91. Regarding the assembly and disassembly work in which the exhaust gas purification device 27 is attached or detached on the upper surface side of the diesel engine 1, the exhaust gas purification device 27, which is a heavy weight component, can be easily handled.

As illustrated in FIGS. 1 to 12, the urea mixing pipe 39 is coupled between the first case 28 and the second case 29 that are integrally adhered by means of the case fixing bodies 95 and 96, thereby forming the exhaust gas purification device 27 as the exhaust purification unit, and a pair of hanging members 91 are arranged in such a manner as to face each other on the outer circumferential side of the diagonal position in a plane view, out of the outer circumferential side of the exhaust gas purification device 27. Accordingly, in the neighborhood of the final assembly process in the assembly process of the diesel engine 1, the exhaust gas purification device 27 can be easily assembled into the diesel engine 1, and the exhaust gas purification device 27 can be easily detached from the diesel engine 1 during maintenance work, repair work of the diesel engine 1, or the like.

As illustrated in FIGS. 1 to 12, the lower surface side of the supporting stand 87 is coupled with the upper surface side of the diesel engine 1 via the plurality of supporting leg bodies 82, 84, and 86, and the supporting stand 87 is arranged on the upper surface side of the diesel engine 1, and the case fixing bodies 95 and 96 are adhered to the approximately horizontal upper surface side of the supporting stand 87 in a detachable manner. Accordingly, while interference with accessory components and the like on the upper surface side of the diesel engine 1 can be easily reduced, the assembly workability of the diesel engine 1 or the maintenance workability of the diesel engine 1 can be easily improved.

As illustrated in FIGS. 1 to 12, regarding structure in which the cooling fan 24 is provided on one side of the diesel engine 1, the height of the approximately horizontal upper surface of the supporting stand 87 is formed higher than the height of the upper portion of the cooling fan 24. Accordingly, the wind from the cooling fan 24 is transferred to the lower surface side of the supporting stand 87, thereby appropriately maintaining the air cooling efficiency of the diesel engine 1, and further the temperature of the exhaust gas purification device 27 as the exhaust purification unit can be prevented from reducing due to the wind from the cooling fan 24, and the exhaust gas purification device 27 is kept at a predetermined temperature or higher, thereby improving the efficiency of exhaust purification.

As illustrated in FIGS. 1 to 12, regarding the engine device for the work vehicle that includes the first case 28 that removes the particulate matter in the exhaust gas of the diesel engine 1 and the second case 29 that removes the nitrogen oxides in the exhaust gas of the diesel engine 1 and connects the first case 28 to the second case 29 via the urea mixing pipe 39, the first case 28 and the second case 29 are integrally adhered by means of the case fixing bodies 95 and 96, the fastening bands 97, and the supporting frame bodies 98 as the clamping means, thereby forming the exhaust purification unit 27, and it is configured that the exhaust gas purification device 27 as the exhaust purification unit is detachably supported in the diesel engine via the case fixing bodies 95 and 96, the fastening bands 97, and the supporting frame bodies 98. Accordingly, the diesel engine 1 and the exhaust gas purification device 27 can be integrally constituted in same vibration structure, which eliminates the vibration-proof coupling for the exhaust linking portions of the first case 28 and the second case 29, and the like, and the exhaust gas discharging paths in the diesel engine 1 and the exhaust gas purification device 27 are configured to reduce costs. Also, the exhaust gas purification device 27 is assembled in advance at a site that is different from the assembly work site of the diesel engine 1, and the exhaust gas purification device 27 can be placed on the diesel engine 1 in the neighborhood of the final process in the assembly work of the diesel engine 1, thereby improving the assembly workability of the diesel engine 1.

As illustrated in FIGS. 1 to 12, it is configured that the supporting stand 87 is approximately horizontally adhered on the upper surface side of the diesel engine 1, and the case fixing bodies 95 and 96 are adhered on the upper surface side of the supporting stand 87 via the supporting frame bodies 98, and the first case 28 and the second case 29 are supported in a sideways posture on the upper surface side of the diesel engine 1 via the case fixing bodies 95 and 96 and the fastening bands 97, and the urea mixing pipe 39 is supported between the first case 28 and the second case 29 on the upper surface side of the first case 28 and the second case 29. Accordingly, the exhaust gas purification device 27 can be easily assembled and disassembled according to the combination and separation of the supporting stand 87 and the supporting frame bodies 98, and the first case 28 and the second case 29 can be reduced in bulk and supported so as to be compact in size on the upper surface side of the diesel engine 1. Also, a mounting interval between the first case 28 and the second case 29 can be maintained constant via the case fixing bodies 95 and 96 and the fastening bands 97, and exhaust gas pipe structure such as the urea mixing pipe 39 between the cases 28 and 29 can be simplified.

As illustrated in FIGS. 9 to 12, it is configured that the lower end side of the plurality of supporting leg bodies 82, 84, and 86 is adhered to the outer circumferential surface of the cylinder head 2 of the diesel engine 1, and the approximately horizontal supporting stand 87 is detachably coupled on the upper end side of the plurality of supporting leg bodies 82, 84, and 86, and the exhaust gas purification device 27 is placed on the upper surface side of the diesel engine 1 via the supporting stand 87. Accordingly, the coupling portions of the plurality of supporting leg bodies 82, 84 and 86 and the supporting stand 87 are attached and detached, and the supporting stand 87 is removed, and the upper surface side of the diesel engine 1 is opened wide, and maintenance work on the upper surface side of the diesel engine 1 can be easily executed, and the supporting stand 87 can be firmly coupled with the cylinder head 2 via the plurality of supporting leg bodies 82, 84, and 86, and the exhaust gas purification device 27 can be supported with high rigidity on the upper surface side of the diesel engine 1.

As illustrated in FIGS. 1 to 7, it is configured that the exhaust gas purification device 27 is supported within a width of the diesel engine 1 in the core-line direction of the output shalt 4 via the supporting stand 87, and the direction intersecting with the core line of the output shaft 4 of the diesel engine 1 corresponds to the transfer direction of the exhaust gas in the first case 28 or the second case 29. Accordingly, the exhaust gas inlet of the first case 28 is directed on the side of the exhaust manifold 6 of the diesel engine 1, so that the exhaust gas purification device 27 can be supported in a posture in which the exhaust gas outlet of the second case 29 is directed on the side of the intake manifold 3 of the diesel engine 1. The exhaust gas path leading from the exhaust manifold 6 of the diesel engine 1 to the exhaust gas outlet of the second case 29 can be formed in such a manner as to be shortened, and the exhaust gas purification device 27 can be placed in a compact way on the upper surface side of the diesel engine 1.

On the other hand, as illustrated in FIGS. 13 and 14, with respect to the front surface of the cabin 57, a tailpipe 78 is vertically installed on the front surface of the corner section on the right side of the cabin 57, and the lower end side of the tailpipe 78 is extended to the interior of the hood 56, and the lower end side of the tailpipe 78 is connected to the SCR outlet pipe 37 via a corrugated-pipe-shaped flexible pipe 79, and the exhaust gas purified in the second case 29 is discharged from the tailpipe 78 to the upward direction of the cabin 57. Mechanical vibration transmitted from the side of the diesel engine 1 to the side of the tailpipe 78 is reduced according to the connection of the flexible pipe 79. Also, with respect to the front surface of the cabin 57, a urea water tank 71 is installed on the left side portion of the hood 56 on the side opposite to the right side portion where the tailpipe 78 is arranged. That is, the tailpipe 78 is arranged at the right side portion of the rear portion of hood 56, whereas the urea water tank 71 is allocated and arranged at the left side portion of the rear portion of the hood 56. It is noted that, as illustrated by a virtual line in FIGS. 13 and 14, in the structure in which the tailpipe 78a for adhering to the side of the diesel engine 1 is included, the tailpipe 78 is integrally coupled with the SCR outlet pipe 37, thereby omitting the flexible pipe 79.

Furthermore, the urea water tank 71 is mounted on the travelling vehicle body 52 (the bottom portion frame of the cabin 57 and the like) of the rear portion on the left side of the hood 56. An oil-feeding port 46 of the fuel tank 45 and a water-feeding port 72 of the urea water tank 71 are adjacently provided on the front-surface lower portion on the left side of the cabin 57. The tailpipe 78 is arranged on the front surface on the right side of the cabin 57, on which the operator is less likely to get on/off, while the oil-feeding port 46 and the water-feeding port 72 are arranged on the front surface on the left side of the cabin 57, on which the operator is more likely to get on/off. It is noted that the cabin 57 is configured in such a manner that the operator can take or leave the maneuvering seat 58 from any of the right side or the left side.

Also, as illustrated in FIGS. 3 to 5, and 14, a urea water injection pump 73 that pressure-feeds the urea aqueous solution in the urea water tank 71, an electric motor 74 that drives the urea water injection pump 73, and a urea water injection nozzle 76 that connects the urea water injection pump 73 via a urea water injection pipe 75 are included. The urea water injection nozzle 76 is mounted on the urea mixing pipe 39 via an injection pedestal 77, and the urea aqueous solution is sprayed from the urea water injection nozzle 76 into the interior of the urea mixing pipe 39.

With the aforementioned constitution, carbon monoxide (CO) or hydrocarbon (HC) in the exhaust gas from the engine 1 is reduced by the oxidation catalyst 30 and the soot filter 31 in the first case 28. Subsequently, the urea water from the urea water injection nozzle 76 is mixed with the exhaust gas from the diesel engine 1 in the interior of the urea mixing pipe 39. Then, the nitrogen oxides (NOx) in the exhaust gas mixed with the urea water as ammonia is reduced by the SCR catalyst 32 and the oxidation catalyst 33 in the second case 29 and discharged from the tailpipe 78 to the outside.

As illustrated in FIGS. 1 to 12, and 15, regarding the engine device for the work vehicle that includes the first case 28 that removes the particulate matter in the exhaust gas of the diesel engine 1 and the second case 29 that removes the nitrogen oxides in the exhaust gas of the diesel engine 1 and connects the first case 28 to the second case 29 via the urea mixing pipe 39, the engine device includes the supporting leg bodies 82, 84, and 86 that are installed in such a manner as to protrude from the diesel engine 1, and the supporting stand 87 adhered to the supporting leg bodies 82, 84, and 86, and it is configured that the first case 28 and the second case 29 are mounted on the plane surface of the supporting stand 87. Accordingly, the supporting stand 87 can be easily adhered to the diesel engine 1 via the supporting leg bodies 82, 84, and 86 in a retrofitting work (in the neighborhood of the final assembly process of the diesel engine 1), and the first case 28 and the second case 29 can be supported in an appropriate posture on the supporting stand 87 of the diesel engine 1, and the attachable and detachable workability of the first case 28 and the second case 29 can be improved.

As illustrated in FIGS. 1 to 12, and 15, with respect to the outer side surface of the diesel engine 1, the plane surface of the supporting stand 87 (the bottom surface of the positioning body 89) is brought in surface contact with the horizontal surface (the exhaust gas outlet surface 7a) of the exhaust gas outlet portion (the exhaust gas outlet pipe 7), and the supporting stand 87 is joined with the outer side surface of the diesel engine 1 via the horizontal surface (the exhaust gas outlet surface 7a) on the outside of the diesel engine 1 and the plane surface of the supporting stand 87 (the bottom surface of the positioning body 89), and it is configured that when the supporting stand 87 is fixed on the supporting leg bodies 82, 84, and 86, the upper surface side of the supporting stand 87 is disposed approximately horizontally. Accordingly, while a mounting angle of the supporting stand 87 can be easily determined with the coupling between the exhaust gas outlet pipe 7 (the exhaust gas outlet portion) and the supporting stand 87, the supporting stand 87 is constituted in metal sheet structure having high rigidity, thereby easily securing the mounting intensity. For example, the assembly workability, for which the mounting angle of the supporting stand 87 with respect to the diesel engine 1 is horizontally formed, and the like can be improved.

As illustrated in FIGS. 1 to 12, and 15, it is configured that the positioning body 89 is integrally adhered to the supporting stand 87, and the positioning body 89 is brought in surface contact with the opening surface (the exhaust gas outlet surface 7a) of the exhaust gas outlet portion (the exhaust gas outlet pipe 7) of the diesel engine 1, and the supporting stand 87 is joined with the side of the diesel engine 1 via the positioning body 89, and the upper surface side of the supporting stand 87 is disposed approximately horizontally. Accordingly, after the supporting stand 87 is formed by press work or the like, the supporting stand 87 and the positioning body 89 are coupled with welding work or the like, and the lower surface of the positioning body 89 can be formed in parallel to the upper surface of the supporting stand 87 with high precision. The upper surface side of the supporting stand 87 can be formed approximately horizontally with the surface contact between the side of the diesel engine 1 and the positioning body 89, without preparing a specific coupling jig for the supporting stand 87. The positioning body 89 is provided as the coupling jig for the supporting stand 87, so that the attachment and detachment work of the supporting stand 87 can be easily executed at a repairing site of the diesel engine 1 and the like, where the coupling jig for the supporting stand 87 has not been prepared.

As illustrated in FIGS. 1 to 12, and 15, regarding the structure in which the first case 28 and the second case 29 are integrally constituted as the exhaust purification unit (the exhaust gas purification device 27), it is configured that the exhaust purification unit (the exhaust gas purification device 27) is integrally attached or detached on the flat upper surface side of the supporting stand 87 whose lower surface side is adhered to the supporting leg bodies 82, 84, and 86. Accordingly, the first case 28 and the second case 29 can be attached or detached as a single component, and the assembly and disassembly workability of the first case 28 and the second case 29, the maintenance workability of the diesel engine 1, or the like can be improved.

As illustrated in FIGS. 1 to 8, regarding the engine device for the work vehicle that includes the first case 28 that removes the particulate matter in the exhaust gas of the diesel engine 1 and the second case 29 that removes the nitrogen oxides in the exhaust gas of the diesel engine 1 and connects the first case 28 to the second case 29 via the urea mixing pipe 39, the diesel engine 1, the first case 28, and the second case 29 are integrally adhered, and the diesel engine 1, the first case 28, and the second case 29 are integrally constituted in a swingable manner. Accordingly, the diesel engine 1, the first case 28, and the second case 29 can be constituted in the same vibration structure, and it is not necessary to apply the vibration-proof coupling to the exhaust path between the diesel engine 1 and the first case 28 and the exhaust path between the first case 28 and the second case 29, so that the exhaust gas path structure between the diesel engine 1 and the second case 29 can be constituted in such a manner as to reduce costs. That is, it is not necessary to connect the vibration-proof members, for example, such as the corrugated flexible pipe or a heat-resistant rubber hose in the exhaust gas path between the first case 28 and the second case 29, so that the exhaust gas path structure between the diesel engine 1 and the second case 29 can be constituted in such a manner as to reduce costs.

As illustrated in FIGS. 1 to 10, the plurality of supporting leg bodies 82, 84, and 86 are vertically installed in the cylinder head 2 of the diesel engine 1, and the supporting stand 87 is coupled with the upper end sides of the plurality of supporting leg bodies 82, 84, and 86, and the first case 28 and the second case 29 are adhered on the upper surface side of the diesel engine 1 via the approximately horizontal supporting stand 87. Accordingly, the supporting stand 87 can be easily separated from the accessory components of the diesel engine 1. Also, the first case 28 and the second case 29 are integrally mounted with respect to the diesel engine 1, thereby simplifying the exhaust gas pipes of the cases 28 and 29, and the first case 28 and the second case 29 can be adhered with high rigidity to the cylinder head 2. In addition, the machining errors of the mounting components such as the supporting stand 87 can be alleviated by adjusting the coupling portions between the plurality of supporting leg bodies 82, 84, and 86 and the supporting stand 87, and an inclination angle in mounting the supporting stand 87 can be easily corrected, and the first case 28 and the second case 29 can be supported in a predetermined posture. The assembly workability, in which the first case 28 and the second case 29 are assembled into the diesel engine 1, can be easily improved.

As illustrated in FIGS. 1 to 8, the DPF inlet pipe 34 of the first case 28 is arranged on the side where the exhaust manifold 6 of the diesel engine 1 is installed, and the first case 28 is mounted in such a manner that the exhaust gas in the first case 28 can be transferred in the direction intersecting with the core line of the output shaft of the diesel engine 1, and the second case 29 is juxtaposed on the lateral section on the installation side of the cooling fan 24 of the diesel engine 1 on the lateral section of the first case 28. Accordingly, the first case 28 and the second case 29 are in close vicinity to each other on the upper surface side of the diesel engine 1 and can be arranged in a compact way, whereas the second case 29 is interposed between the cooling fan 24 and the first case 28, thereby suppressing the reduction in temperature of the first case 28 due to the wind from the cooling fan 24. Also, the urea mixing pipe 39 that supplies the exhaust gas from the first case 28 to the second case 29 is supported between the first case 28 and the second case 29, so that the second case 29 is interposed between the cooling fan 24 and the urea mixing pipe 39, and the reduction in temperature of the urea mixing pipe 39 due to the wind from the cooling fan 24 can be suppressed.

As illustrated in FIGS. 1 to 8, 13, and 14, regarding the work vehicle in which the operating cabin 57 is arranged in rear of the hood 56 in which the diesel engine 1 is internally installed, the urea water tank 71 for exhaust gas purification is installed between the front portion of the operating cabin 57 and the rear portion of the diesel engine 1. Accordingly, the urea water tank 71 can be heated with the waste heat of the diesel engine 1 and the like, and the urea aqueous solution having a predetermined temperature or higher can be maintained in the urea water tank 71, and the reduction in the capacity of the exhaust gas purification of the second case 29 can be prevented in cold districts and the like. The water-feeding port 72 of the urea water tank 71 can be adjacently arranged on the operator's boarding and alighting portion of the operating cabin 57, and water-feeding work of the urea aqueous solution into the urea water tank 71 can be easily executed at the operator's boarding and alighting sites, and the workability of replenishing the urea aqueous solution for the exhaust gas purification can be improved.

As illustrated in FIGS. 1 to 12, and 17, regarding the engine device for the work vehicle that includes the first case 28 that removes the particulate matter in the exhaust gas of the diesel engine 1 and the second case 29 that removes the nitrogen oxides in the exhaust gas of the diesel engine 1 and connects the first case 28 to the second case 29 via the urea mixing pipe 39, the engine device includes the plurality of case fixing bodies 95 and 96 for adhering to the first case 28 and the second case 29 and the supporting frame bodies 98 for adhering to the plurality of case fixing bodies 95 and 96, and the case fixing bodies 95 and 96 and the supporting frame bodies 98 are coupled in such a manner that the mounting angle (mounting position) can be adjusted, and the posture of the exhaust gas inlet portion 34 of the first case 28 is configured to be capable of adjusting with respect to the mounting surface of the diesel engine 1, so that when the first case 28 and the second case 29 are assembled into the diesel engine 1 as a single unit, the mounting angles of the case fixing bodies 95 and 96 and the supporting frame bodies 98 are adjusted, and the coupling surface of the DPF inlet pipe 34 as the exhaust gas inlet portion of the first case 28 can be easily joined with the exhaust gas outlet surface 7*a* of the diesel engine 1. The mounting positioning work of the first case 28 and the second case 29 can be simplified. That is, the attachable and detachable workability of the first case 28 and the second case 29 can be improved, and the assembly work or the maintenance work of the diesel engine 1 can be easily simplified.

As illustrated in FIGS. 1 to 12, the exhaust gas purification device 27 as the exhaust purification unit is formed with the cases 28 and 29, the case fixing bodies 95 and 96, and the supporting frame bodies 98, and the lower end sides of the plurality of supporting leg bodies 82, 84, and 86 are adhered to the outer side surface of the cylinder head 2 of the diesel engine 1, and the supporting frame bodies 98 are coupled with the upper end sides of the plurality of supporting leg bodies 82, 84, and 86. Accordingly, the maintenance work on the upper surface side of the diesel engine 1 and the like can be easily executed through the attachment or detachment of the exhaust gas purification device 27. The supporting frame bodies 98 are firmly coupled with the cylinder head 2 via the plurality of supporting leg bodies 82, 84, and 86, and while the exhaust gas purification device 27 can be supported with high rigidity on the upper surface side of the diesel engine 1 and the like, interference with the accessory components of the diesel engine 1 can be easily reduced.

As illustrated in FIGS. 1 to 12, the supporting stand 87 is arranged approximately horizontally on the upper surface side of the diesel engine 1 via the plurality of supporting leg bodies 82, 84, and 86, and the supporting frame bodies 98 are adhered on the upper surface side of the supporting stand 87. Accordingly, during the maintenance work or repair work of the diesel engine 1, the first case 28 and the second case 29 can be easily detached from the diesel engine 1, and the maintenance work and the like on the upper surface side of the diesel engine 1 can be simplified.

As illustrated in FIGS. 1 to 12, and 15, it is configured that part of the lower surface side of the supporting stand 87 is brought in surface contact with part of the exhaust gas outlet surface 7*a* of the diesel engine 1, and the supporting stand 87 is fixed on the diesel engine 1 in a horizontal posture with the exhaust gas outlet surface 7*a* of the diesel engine 1 as a reference. Accordingly, the supporting stand 87 having high rigidity structure can be constituted with low costs by means of sheet metal processing, and the positioning work at the time of assembly, in which the supporting frame bodies 98 are assembled on the upper surface side of the supporting stand 87, can be easily simplified, and the supporting stand 87 can be easily coupled with the diesel engine 1 in a predetermined supporting posture.

Subsequently, as illustrated in FIGS. 1, 2, and 5, in the interior of the first case 28, the differential pressure sensor 111 for detecting a difference between the exhaust gas pressure on the exhaust gas intake side (upstream side) and the exhaust gas pressure on the exhaust gas discharge side (downstream side) of the soot filter 31 is included. One end side of the sensor bracket 112 is fastened with bolts to the SCR inlet-side flange body 40, and the other end side of the sensor bracket 112 is provided in such a manner as to protrude from the SCR inlet-side flange body 40 to the upper surface side of the first case 28, and the differential pressure sensor 111 is adhered to the other end side of the sensor bracket 112. The differential pressure sensor 111 is arranged on the upper lateral section of the first case 28 via the sensor bracket 112. It is noted that one end sides of an upstream-side sensor pipe 113 and a downstream-side sensor pipe 114, each of which is made of synthetic rubber, are respectively connected to the differential pressure sensor 11. In the first case 28, the other end sides of the upstream-side sensor pipe 113 and the downstream-side sensor pipe 114 are respectively connected to the upstream side and downstream side of the soot filter 31.

Also, an upstream-side gas temperature sensor 115 for detecting an exhaust temperature on the exhaust gas intake side of the diesel oxidation catalyst 30, and a downstream-side gas temperature sensor 116 for detecting an exhaust temperature on the exhaust gas discharge side of the diesel oxidation catalyst 30 are included, and a difference (differential pressure of exhaust gas pressure) between exhaust gas pressure on the inflow side of the soot filter 31 and exhaust gas pressure on the outflow side of the soot filter 31 is detected by the differential pressure sensor 111, and an exhaust gas temperature of the diesel oxidation catalyst 30 portion on the exhaust gas intake side of the soot filter 31 is detected by each of sensors 115 and 116. That is, the residual amount of particulate matter in the exhaust gas captured by the soot filter 31 is proportional to the differential pressure of the exhaust gas, and therefore, when the amount of particulate matter remaining in the soot filter 31 increases to a predetermined amount or more, soot filter regeneration control (for example, fuel injection control or intake control of the diesel engine 1 wherein the exhaust gas temperature is raised), in which the amount of particulate matter in the soot filter 31 is reduced, is executed based on the detection results of the differential pressure sensor 111.

Figure 18:
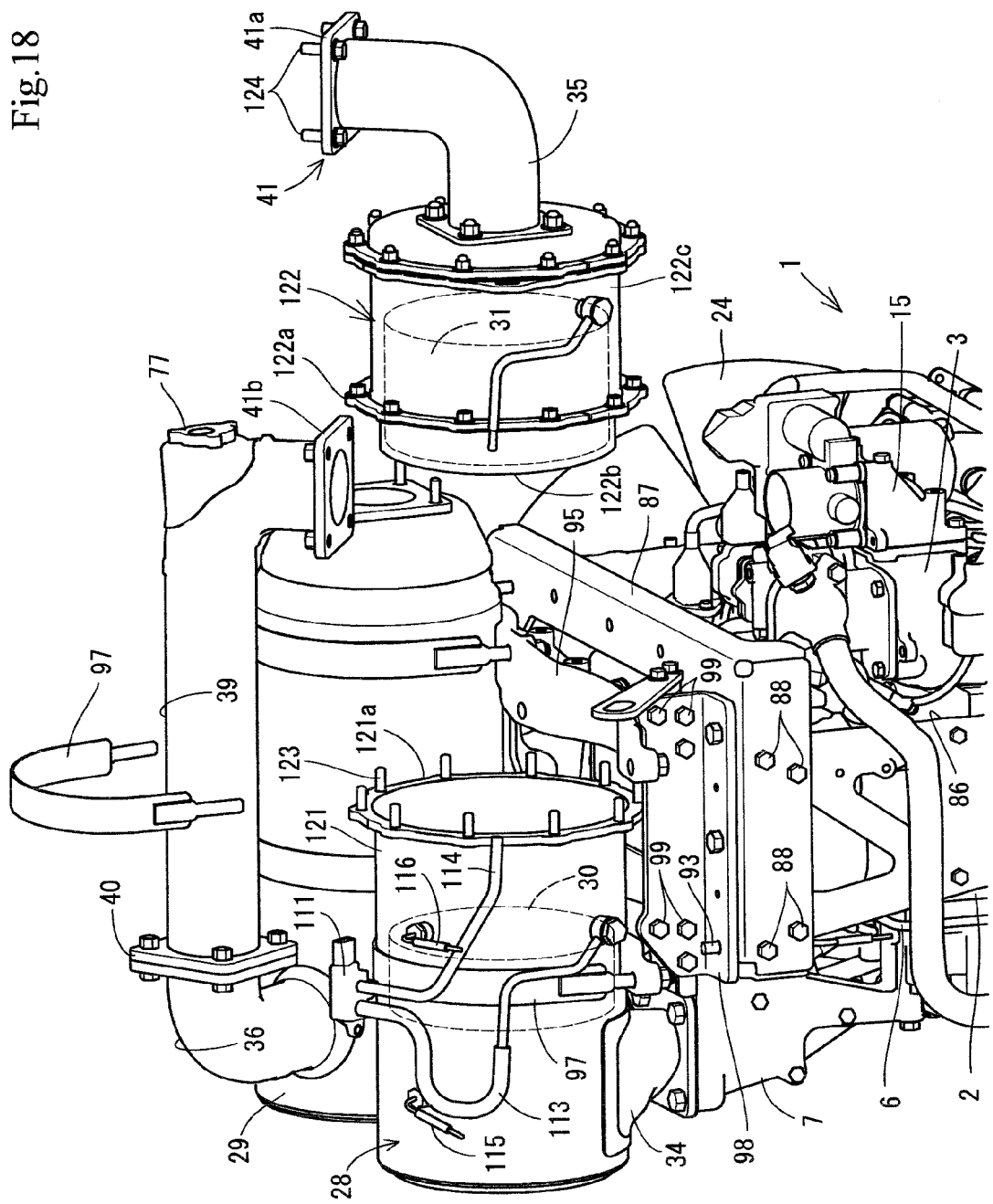
FIG. 18 is a perspective rear view in which part of a first case is disassembled.
Figure 19:
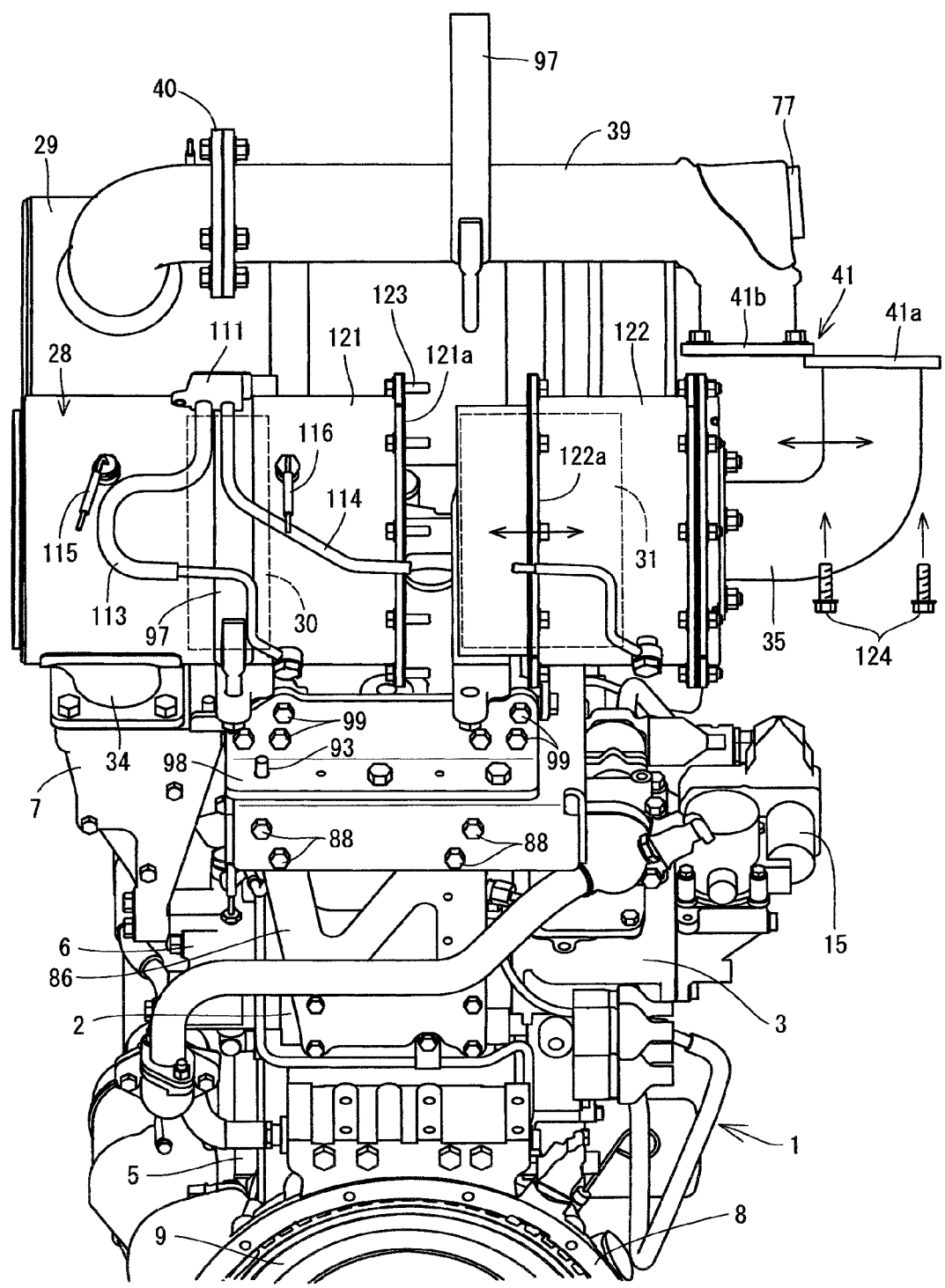
FIG. 19 is an explanatory view during detachment in which part of the first case is disassembled.

Subsequently, the assembly and disassembly structure of the first case 28 will be described referring to FIGS. 18 and 19. As illustrated in FIGS. 18 and 19, the first case 28 is formed of an exhaust intake side case 121 in which the DPF inlet pipe 34 is provided, and an exhaust discharge side case 122 in which the DPF outlet pipe 35 is provided. It is configured that the oxidation catalyst 30 is internally installed in the exhaust intake side case 121, and the soot filter 31 is internally installed in an inner tube 122b of the exhaust discharge side case 122, and the exhaust gas intake side of the inner tube 122b is internally installed in an outer tube 122c of the exhaust discharge side case 122, and the exhaust gas discharge side of the inner tube 122b is protruded from the outer tube 122c.

Also, the exhaust gas discharge side of the inner tube 122b is inserted into the exhaust intake side case 121 in an insertable and extractable manner, and a case flange body 121a of the exhaust intake side case 121 and a case flange body 122a of the outer tube 122c are fastened with bolts 123 in a separable manner, and the exhaust intake side case 121 and the exhaust discharge side case 122 are coupled with each other in a detachable manner. In contrast, the DPF outlet pipe 35 as an exhaust outlet pipe is provided in the exhaust discharge side case 122 (the outer tube 122c), and the exhaust gas outlet side of the DPF outlet pipe 35 is extended in the radial direction (the direction intersecting with the cylindrical axial line of the first case 28) intersecting with the transfer direction of the exhaust gas in the first case 28. Furthermore, the DPF outlet-side flange body 41 for coupling the urea mixing pipe 39 with the DPF outlet pipe 35 is formed of an outlet pipe flange 41a of the exhaust gas outlet-side end portion of the DPF outlet pipe 35 and a mixing pipe flange 41b of the exhaust gas inlet-side end portion of the urea mixing pipe 39, and the outlet pipe flange 41a is positioned on the outer lateral section of the cylindrical outer circumferential surface of the exhaust discharge side case 122 (the outer tube 122c).

That is, on the outside of the exhaust discharge side case 122, the DPF outlet pipe 35 is extended on the outside in the direction intersecting with the transfer direction of the exhaust gas, and the coupling portion (the DPF outlet-side flange body 41) of the urea mixing pipe 39 and the DPF outlet pipe 35 is disposed at a position deviated from the separation locus of the exhaust discharge side case 122, separated in the transfer direction of the exhaust gas. It is configured that the mixing pipe flange 41b is fastened with bolts 124 to the outlet pipe flange 41a, and one end side of the urea mixing pipe 39 is coupled with the DPF outlet pipe 35, and the other end side of the urea mixing pipe 39 is coupled with the SCR inlet pipe 36 via the SCR inlet-side flange body 40, and the DPF outlet pipe 35, the urea mixing pipe 39, and the SCR inlet pipe 36 are integrally fixed.

With the aforementioned constitution, when the residual amount (the detection values of the differential pressure sensor 111 and the like) of particulate matter in the soot filter 31 increases to or over a range where the regeneration control can be performed, the bolts 123 are removed, and the fastening of the case flange bodies 121a and 122a is released, and when the bolts 124 are removed, and the fastening of the outlet pipe flange 41a and the mixing pipe flange 41b is released, the exhaust discharge side case 122 can be separated from the exhaust intake side case 121. The exhaust discharge side case 122 is alienated from the exhaust intake side case 121 in the direction of the cylindrical axial line of the first case 28 (the transfer direction of the exhaust gas), and the inner tube 122b is pulled out from the exhaust intake side case 121, thereby disassembling the first case 28 in a detachable manner. Next, the maintenance work of the first case 28, in which the soot filter 31 is taken out from the inner tube 122b, and the particulate matter in the soot filter 31 is artificially removed, is carried out.

It is noted that when the bolts 123 are removed, and the fastening of the case flange bodies 121a and 122a is released, the exhaust intake side case 121 is supported by the exhaust gas outlet pipe 7 via the DPF inlet pipe 34, and when the bolts 124 are removed, and the fastening of the outlet pipe flange 41a and the mixing pipe flange 41b is released, the urea mixing pipe 39 is supported by the second case 29 via the SCR inlet-side flange body 40. Accordingly, in the maintenance (filter regeneration) work of the soot filter 31, it is only necessary to remove the exhaust discharge side case 122, but it is not required to remove the exhaust intake side case 121 or the urea mixing pipe 39, so that the maintenance man-hour of the soot filter 31 can be reduced, compared with the structure required for the disassembly of the exhaust intake side case 121 or the urea mixing pipe 39.

As illustrated in FIGS. 1 to 7, 18, and 19, regarding the engine device for the work vehicle that includes the first case 28 that removes the particulate matter in the exhaust gas of the engine 1 and the second case 29 that removes the nitrogen oxides in the exhaust gas of the engine 1 and connects the first case 28 to the second case 29 via the urea mixing pipe, the first case 28 is formed in such a manner as to be divided into the exhaust intake side case 121 and the exhaust discharge side case 122, and the exhaust discharge side case 122 is configured to be separable in a state where the exhaust intake side case 121 is supported on the side of the engine 1. Accordingly, during the maintenance work in the interior of the first case 28, it is not required to remove the whole of the first case 28, and the number of detachable components that necessitate the maintenance work in the interior of the exhaust discharge side case 122 (the first case) can be easily reduced, and the soot filter 31 internally installed in the exhaust discharge side case 122 and the like can be easily detached, and the cleaning man-hour of the interior of the exhaust discharge side case 122 or the soot filter 31, or the like can be reduced.

As illustrated in FIGS. 1 to 7, 18, and 19, the DPF outlet pipe 35 as an exhaust outlet pipe that connects the urea mixing pipe 39 to the first case 28 is included, and on the outside of the exhaust discharge side case 122, the DPF outlet pipe 35 is extended on the outside in the direction intersecting with the transfer direction of the exhaust gas, and the coupling portion (the DPF outlet-side flange body 41) of the urea mixing pipe 39 and the DPF outlet pipe 35 is disposed at a position deviated from the separation locus of the exhaust discharge side case 122, which is separated in the transfer direction of the exhaust gas. Accordingly, the fastening bolts of the coupling portion of the urea mixing pipe 39 and the DPF outlet pipe 35, or the like are detached, and the coupling of the exhaust intake side case 121 and the exhaust discharge side case 122 is released, so that the exhaust discharge side case 122 is slid in the transfer direction of the exhaust gas in the first case 28, thereby easily separating the exhaust discharge side case 122 from the exhaust intake side case 121.

As illustrated in FIGS. 1 to 7, 18, and 19, it is configured to include the case fixing bodies 95 and 96 and the fastening bands 97, as a clamping means, for adhering to the exhaust intake side case 121 and the second case 29, and the case fixing bodies 95 and 96 and the fastening bands 97, as a clamping means, for adhering to the exhaust discharge side case 122 and the second case 29, and the first case 28 and the second case 29 are integrally adhered by means of the case fixing bodies 95 and 96 and the fastening bands 97, thereby forming the exhaust gas purification device 27 as the exhaust purification unit. Accordingly, the exhaust discharge side case 122 can be easily detached by removing the fastening bands 97 that fasten the exhaust discharge side case 122 and the second case 29. During the maintenance of the interior of the exhaust discharge side case 122, the attachment or detachment work of the fastening band 97 that fastens the exhaust intake side case 121 and the second case 29 is eliminated, so that maintenance (the cleaning of the soot filter) workability in the interior of the exhaust discharge side case 122 can be improved.

As illustrated in FIGS. 1, and 9 to 12, it is configured to include the case fixing bodies 95 and 96 and the fastening bands 97 with which the first case 28 and the second case 29 are integrally adhered, and the supporting stand 87 for mounting the case fixing bodies 95 and 96, and the plurality of supporting leg bodies 82, 84 and 86 are vertically installed on the upper surface side of the diesel engine 1, and the supporting stand 87 is coupled with the exhaust manifold 6 of the diesel engine 1 and the plurality of supporting leg bodies 82, 84 and 86. Accordingly, the machining errors of the mounting components such as the supporting stand 87 can be alleviated by adjusting the coupling portions between the supporting leg bodies 82, 84, and 86 and the supporting stand 87, and an inclination angle in mounting the supporting stand 87 can be easily corrected, and the first case 28 and the second case 29 can be easily supported in a predetermined posture, and the supporting stand 87 is separated away from the accessory components of the diesel engine 1, thereby supporting the first case 28 and the second case 29 in such a manner as to eliminate mutual interference. The assembly workability, in which the first case 28 and the second case 29 are assembled into the diesel engine 1, can be easily improved.

Figure 20:
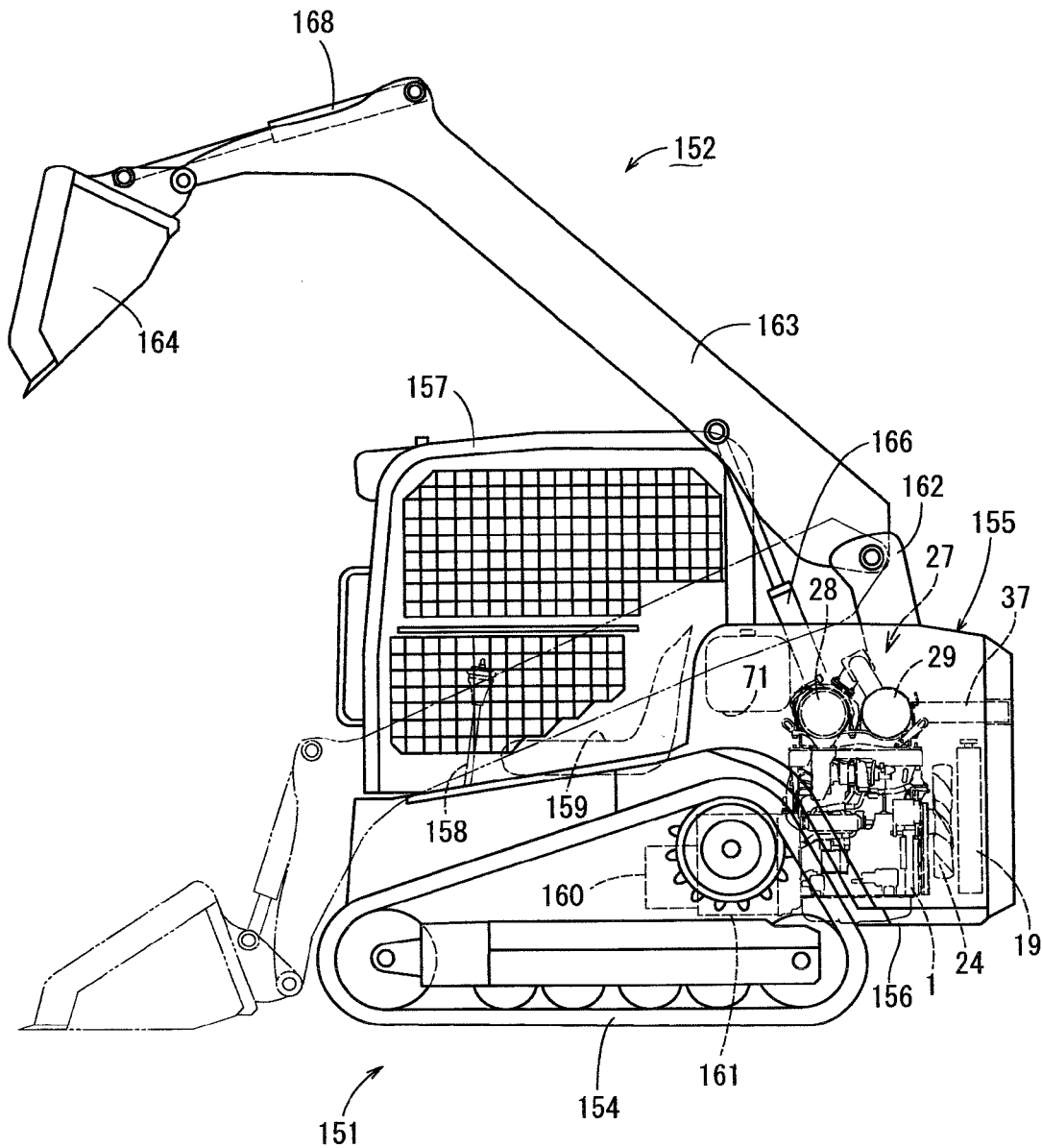
Fig. 20 is a side view of a work vehicle in which the diesel engine is mounted.
Figure 21:
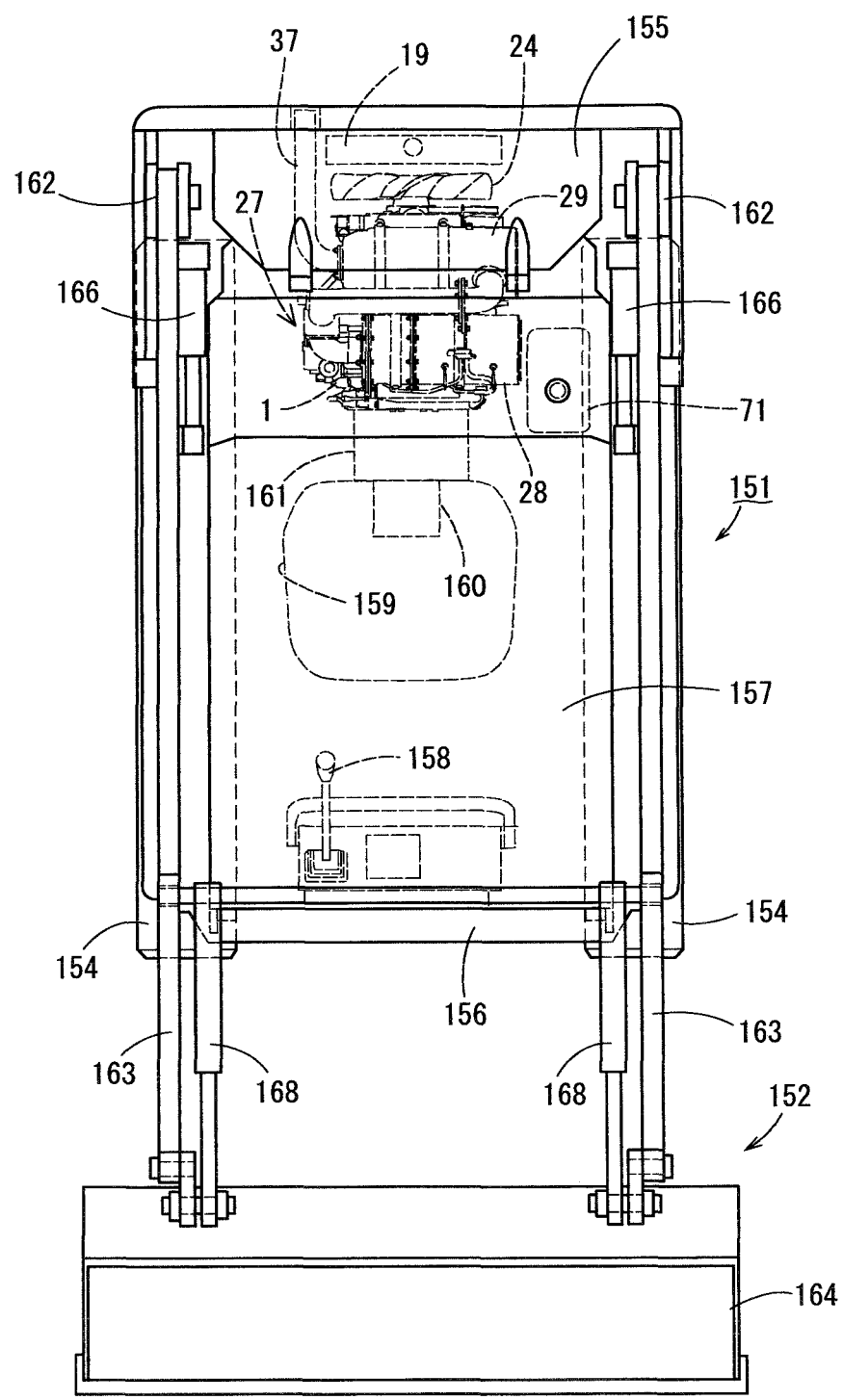
FIG. 21 is a plan view of the work vehicle.

Next, a skid-steer loader 151 in which the diesel engine 1 is mounted will be described referring to FIGS. 20 and 21. The skid-steer loader 151 as the work vehicle illustrated in FIGS. 20 and 21 is configured to be equipped with a loader device 152 described later and perform loading work. The skid-steer loader 151 is equipped with right and left travelling crawlers 154. Also, a hood 155 that is openable and closable is arranged above the travelling crawlers 154 of the skid-steer loader 151. The diesel engine 1 is stored in the hood 155. In the interior of the hood 155, the first case 28 and the second case 29 are placed and fixed on the upper surface portion of the diesel engine 1.

The diesel engine 1 is supported by a travelling vehicle body 156 included in the skid-steer loader 151 via a vibration-proof member and the like. A cabin 157 in which an operator gets on is arranged in front of the hood 155, and a maneuvering handle 158, an operating seat 159, and the like are provided in the interior of the cabin 157. Also, a loading work hydraulic pressure pump device 160 that is driven by the diesel engine 1 and a travelling mission device 161 for driving the right and left travelling crawlers 154 are provided. The motive power from the diesel engine 1 is transmitted to the right and left travelling crawlers 154 via the travelling mission device 161. An operator who takes the operating seat 159 can perform the driving operation of the skid-steer loader 151 and the like via an operating portion such as the maneuvering handle 158.

Also, the loader device 152 includes loader posts 162 arranged on both sides of the right and left of the travelling vehicle body 156, a pair of right and left lift arms 163 coupled with the upper end of each loader post 162 in an oscillatory manner up and down, and buckets 164 coupled with the tip end portions of the right and left lift arms 163 in an oscillatory manner up and down.

A lift cylinder 166 for oscillating the lift arm 163 up and down is provided between each loader post 162 and the corresponding lift arm 163. A bucket cylinder 168 for oscillating the bucket 164 up and down is provided between the right and left lift arms 163 and the buckets 164. In this case, it is configured that the operator on the operating seat 159 operates a loader lever (not illustrated), and the hydraulic pressure force of the loading work hydraulic pressure pump device 160 is controlled, and the lift cylinders 166 or the bucket cylinders 168 operate in a stretchable, contractible manner, and the lift arms 163 or the buckets 164 are oscillated up and down, thereby executing the loading work. It is noted that the urea water tank 71 is internally installed in the upper portion of the front lateral section of the hood 155. Also, the radiator 19 arranged opposite to the cooling fan 24 is internally installed in the rear portion of the hood 155.

REFERENCE SIGNS LIST

1 Diesel engine
2 Cylinder head
6 Exhaust manifold
24 Cooling fan
28 First case
29 Second case
34 DPF inlet pipe
39 Urea mixing pipe
56 Hood
57 Cabin
71 Urea water tank
82 Front portion supporting leg body
84 Lateral portion supporting leg body
86 Rear portion supporting leg body
87 Supporting stand

The invention claimed is:

1. An engine device for a work vehicle, the engine device comprising: a first case configured to remove particulate matter in an exhaust gas of an engine, a second case for removing nitrogen oxides in the exhaust gas of the engine, and a urea mixing pipe configured to connect the first case to the second case, wherein the first case and the second case are integrally attached by case fixing bodies, fastening bands, and supporting frame bodies to form an exhaust gas purification unit, and wherein a plurality of supporting leg bodies are vertically installed in a cylinder head of the engine, and a supporting stand is coupled on an upper end side of the first plurality of supporting leg bodies, and the supporting stand is attached to an upper surface side of the engine in an approximately horizontal state, and the case fixing bodies are attached to an upper surface side of the supporting stand via the supporting frame bodies, and wherein the engine, the first case, and the second case are configured to be integrally vibrated in a swingable manner, wherein an inlet pipe of the first case is arranged on a side where an exhaust manifold of the engine is installed, and wherein the second case is juxtaposed on a lateral part of the first case on an installation side of a cooling fan of the engine, and wherein the urea mixing pipe is supported between the first case and the second case on an upper surface side of the first and second cases.

2. The engine device for the work vehicle according to claim 1, wherein the work vehicle comprises an operating cabin arranged in a rear of a hood in which the engine is internally installed, and wherein a urea water tank for exhaust gas purification is installed between a front portion of the operating cabin and a rear portion of the engine.

3. The engine device for the work vehicle according to claim 1, wherein the first case is divided into an exhaust intake side case and an exhaust discharge side case, and the exhaust discharge side case is configured to be separable in a state where the exhaust intake side case is supported on the engine side.

4. The engine device for the work vehicle according to claim 3, further comprising an exhaust outlet pipe configured to couple the first case with the urea mixing pipe, and wherein the exhaust outlet pipe is extended on an outer side in a direction intersecting with a transfer direction of the exhaust gas, on an outer side of the exhaust discharge side case, and wherein a coupling portion between the urea mixing pipe and the exhaust outlet pipe is disposed at a position deviated from a separation locus of the exhaust discharge side case separated in the transfer direction of the exhaust gas.

5. The engine device for the work vehicle according to claim 3, further comprising a first clamping body for adhering the exhaust intake side case and the second case; and a second clamping body for adhering the exhaust discharge side case and the second case, and wherein the first case and the second case are integrally attached with each clamping body, thereby forming an exhaust purification unit.

6. The engine device for a work vehicle according to claim 1, wherein the plurality of supporting leg bodies comprises three leg bodies.

7. The engine device for a work vehicle according to claim 1, wherein the plurality of supporting leg bodies comprises a front portion supporting leg body, a lateral portion supporting leg body, and a rear portion supporting leg body.

8. The engine device for a work vehicle according to claim 1, wherein each of the plurality of supporting leg bodies extends longitudinally in a direction from the cylinder head to the supporting stand.

9. The engine device for a work vehicle according to claim 1, wherein a first of the fastening bands is operably connected to the first case and a second of the fastening bands is operably connected to the second case, and wherein each fastening band is operably connected to one of the case fixing bodies.

10. The engine device for a work vehicle according to claim 1, wherein the first case is mounted in such a manner that the exhaust gas in the first case can transfer in a direction intersecting with a longitudinal axis of an output shaft of the engine.

* * * * *